US009717080B2

(12) United States Patent
Golitschek Edler von Elbwart et al.

(10) Patent No.: US 9,717,080 B2
(45) Date of Patent: *Jul. 25, 2017

(54) COMMON MAPPING OF RESOURCE ELEMENTS TO ENHANCED RESOURCE ELEMENT GROUPS

(71) Applicant: Panasonic Intellectual Property Corporation of America, Torrance, CA (US)

(72) Inventors: Alexander Golitschek Edler von Elbwart, Darmstadt (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,121

(22) Filed: Dec. 19, 2016

(65) Prior Publication Data

US 2017/0099655 A1 Apr. 6, 2017

Related U.S. Application Data

(63) Continuation of application No. 14/402,209, filed as application No. PCT/EP2013/060042 on May 15, 2013.

(30) Foreign Application Priority Data

May 21, 2012 (EP) .................................... 12003945

(51) Int. Cl.
*H04W 72/04* (2009.01)
*H04J 11/00* (2006.01)
(Continued)

(52) U.S. Cl.
CPC .......... *H04W 72/042* (2013.01); *H04J 11/00* (2013.01); *H04L 5/0007* (2013.01);
(Continued)

(58) Field of Classification Search
CPC ... H04L 5/0053; H04L 5/0094; H04L 5/0007; H04W 72/048; H04W 72/0453; H04W 72/042
(Continued)

(56) References Cited

U.S. PATENT DOCUMENTS

2011/0268046 A1* 11/2011 Choi .................... H04L 5/0007
370/329
2014/0078978 A1* 3/2014 Cheng .................. H04L 5/0053
370/329
(Continued)

FOREIGN PATENT DOCUMENTS

EP 2 398 180 A1 12/2011

OTHER PUBLICATIONS

"3rd Generation Partnership Project; Technical Specification Group Radio Access Network; Evolved Universal Terrestrial Radio Access (E-UTRA); Physical channels and modulation (Release 8)," Technical Specification, 3GPP TS 36.211 V8.0.0, Sep. 2007, 50 pages.
(Continued)

*Primary Examiner* — Jae Y Lee
*Assistant Examiner* — Jean F Voltaire
(74) *Attorney, Agent, or Firm* — Seed IP Law Group LLP

(57) ABSTRACT

The invention relates to a universal mapping of resource elements (REs) to enhanced resource element groups (eREG) that applies to both the PDCCH and PDSCH regions; the mapping is universal since it is not user or cell-specific but applies to the resource block pairs irrespective of the actual reference signals used. The mapping is such that all REs of the resource block pair are assigned to
(Continued)

one out of a plurality of eREGs. According to the mapping, the REs are sequentially assigned to the eREGs, in predetermined orders. Within an OFDM symbol a pair of REs is assigned to the same eREG, wherein the two REs are spaced apart from each other by 3 or 6 subcarriers.

15 Claims, 23 Drawing Sheets

(51) Int. Cl.
H04L 5/00 (2006.01)
H04W 88/08 (2009.01)
(52) U.S. Cl.
CPC .......... *H04L 5/0042* (2013.01); *H04L 5/0053* (2013.01); *H04W 72/048* (2013.01); *H04W 72/0453* (2013.01); *H04L 5/0094* (2013.01); *H04W 88/08* (2013.01)
(58) Field of Classification Search
USPC .......................................................... 370/329
See application file for complete search history.

(56) References Cited

U.S. PATENT DOCUMENTS

2014/0301287 A1* 10/2014 Frenne ................. H04L 5/0048
370/329

2015/0180625 A1* 6/2015 Park ..................... H04W 72/04
370/329

OTHER PUBLICATIONS

"3rd Generation Partnership Project; Technical Specification Group Radio Access Network; Evolved Universal Terrestrial Radio Access (E-Utra); Physical Channels and Modulation (Release 10)," Technical Specification, 3GPP TS 36.211 V10.4.0, Dec. 2011, 101 pages.
"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.0.0, Sep. 2007, 30 pages.
Alamouti, "A Simple Transmit Diversity Technique for Wireless Communications," IEEE Journal on Select Areas in Communications 16(8), 1998, pp. 1451-1458.
Extended European Search Report, mailed Jan. 24, 2013, for European Application No. 12003945.8-1237, 9 pages
International Search Report, mailed Aug. 26, 2013, for International Application No. PCT/EP2013/060042, 4 pages
Partial European Search Report, dated Oct. 9, 2012, for European Application No. 12003945.8-1237, 5 pages.
Sesia et al., "LTE—The UMTS Long Term Evolution—From Theory to Practice," John Wiley & Sons, Ltd., 2009, Sections 6 and 9, 63 pages.
Sesia et al., "LTE—The UMTS Long Term Evolution—From Theory to Practice," Second Edition, John Wiley & Sons, Ltd., 2011, 794 pages.

* cited by examiner

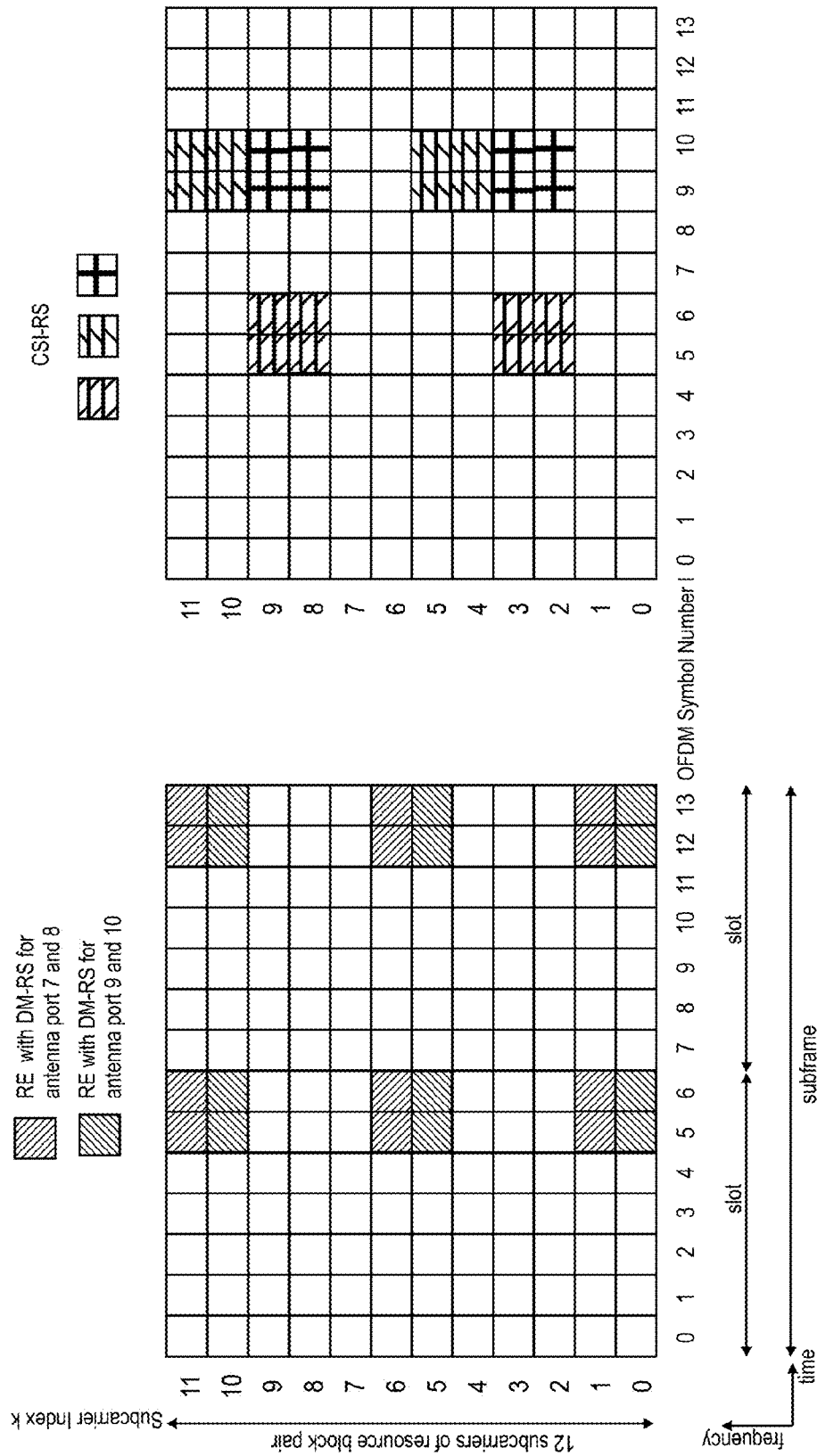

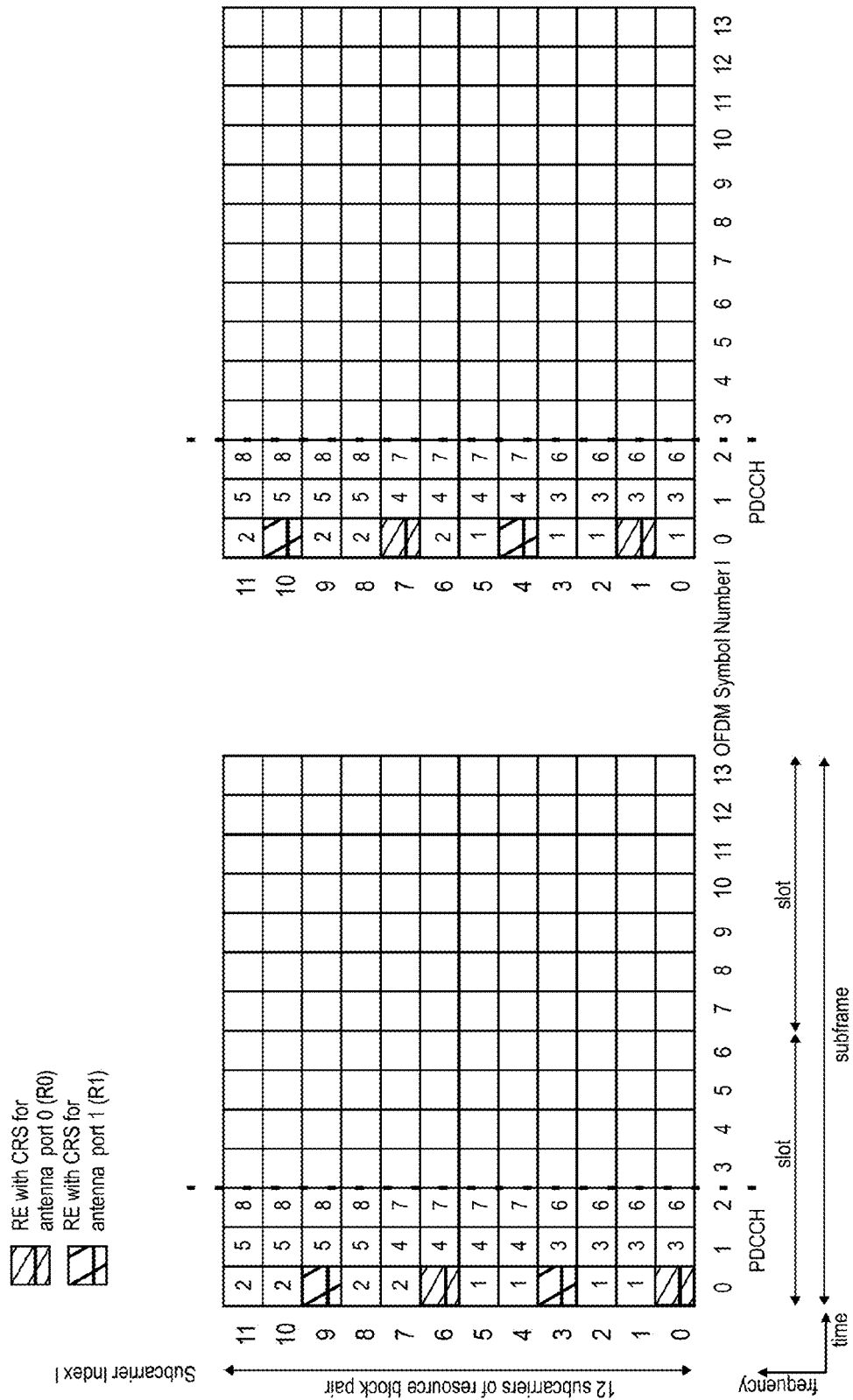

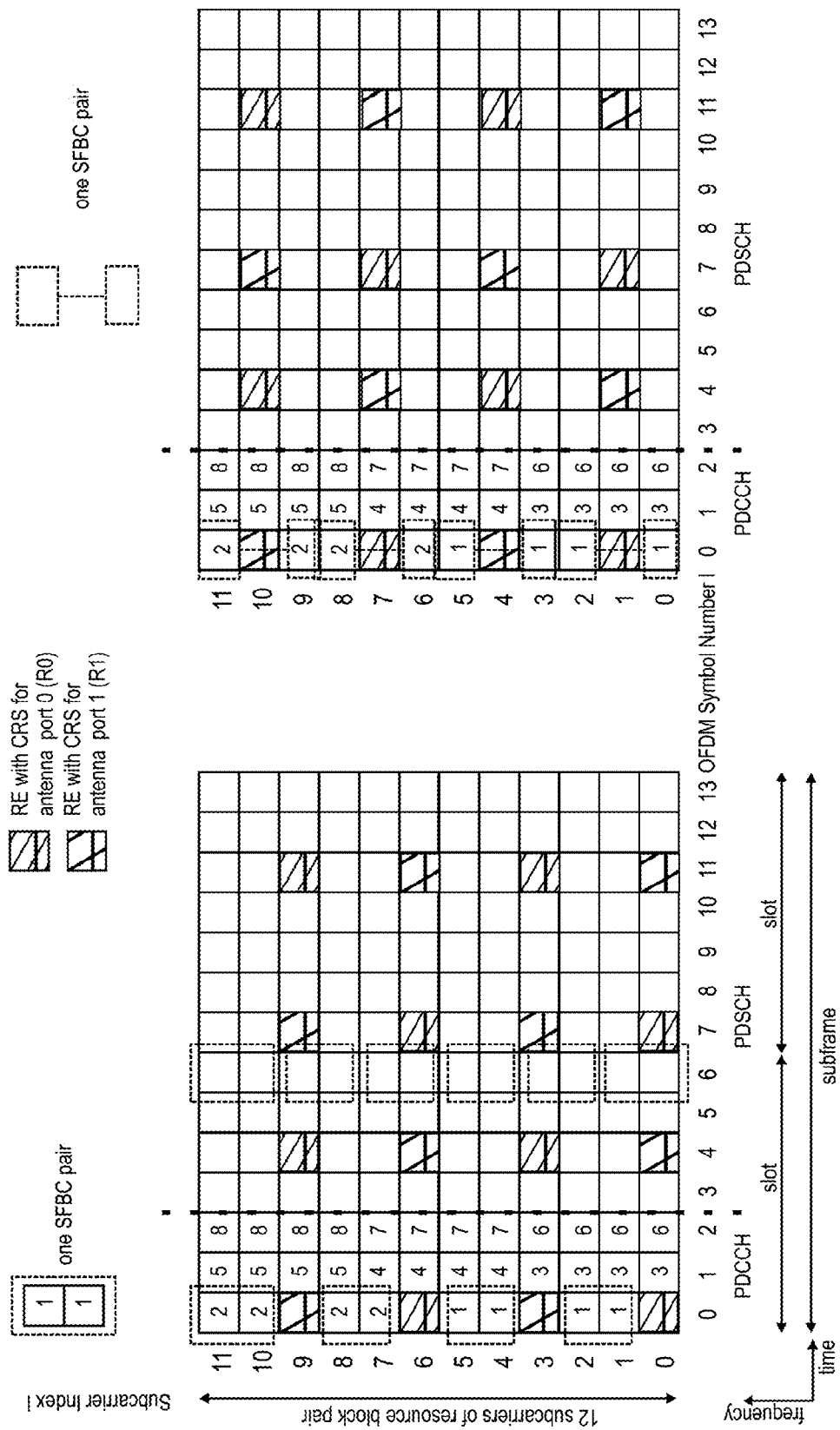

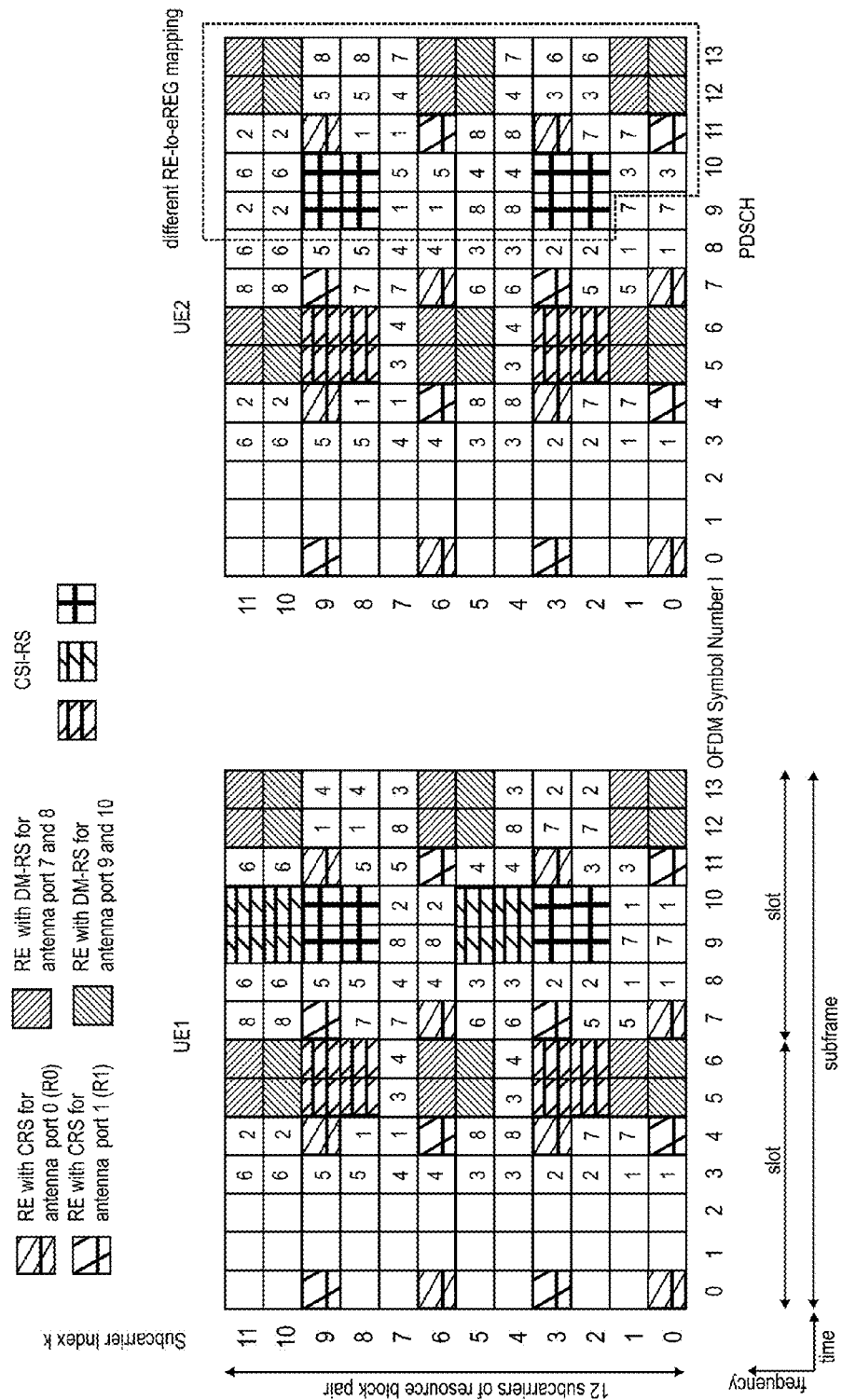

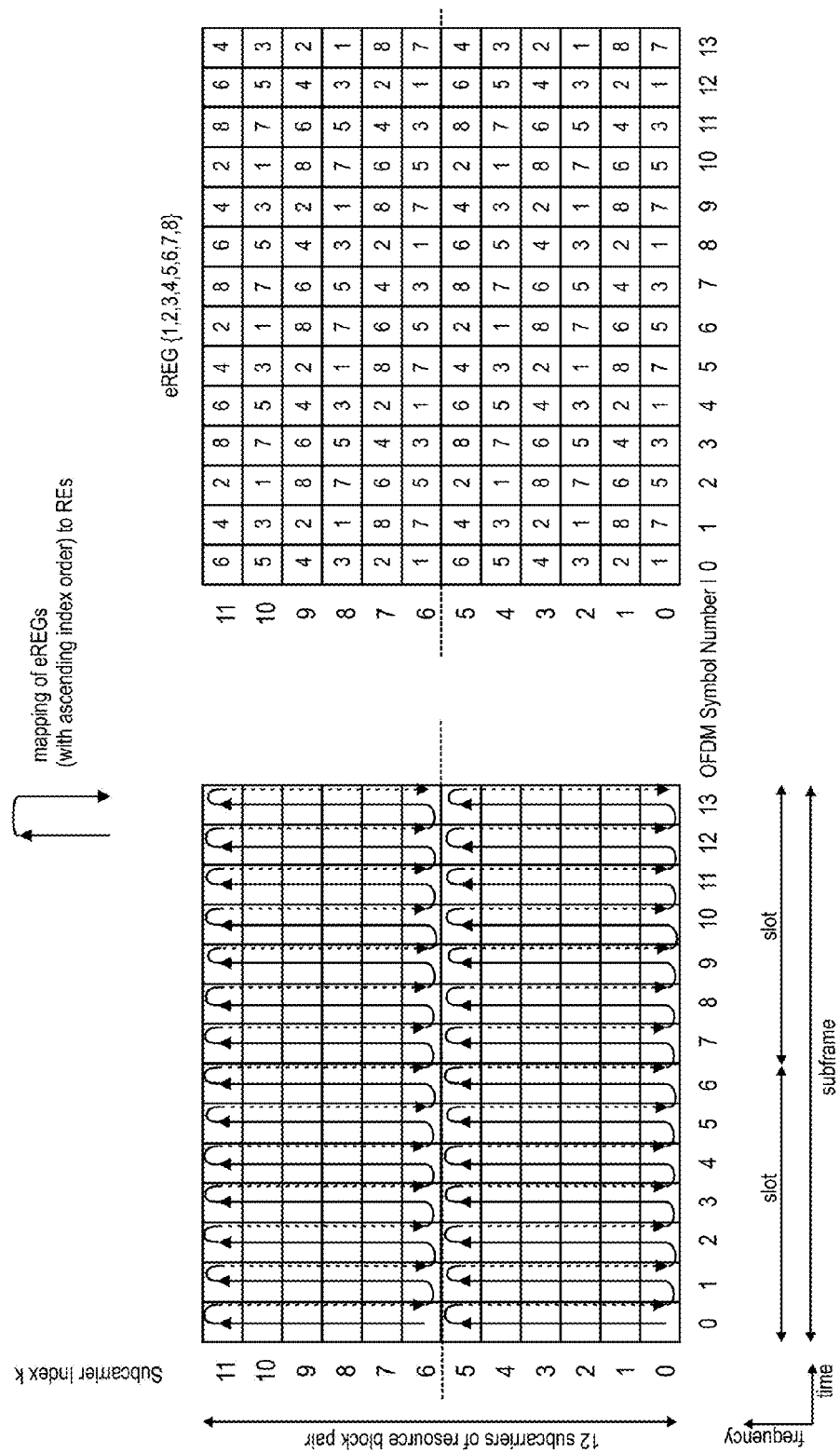

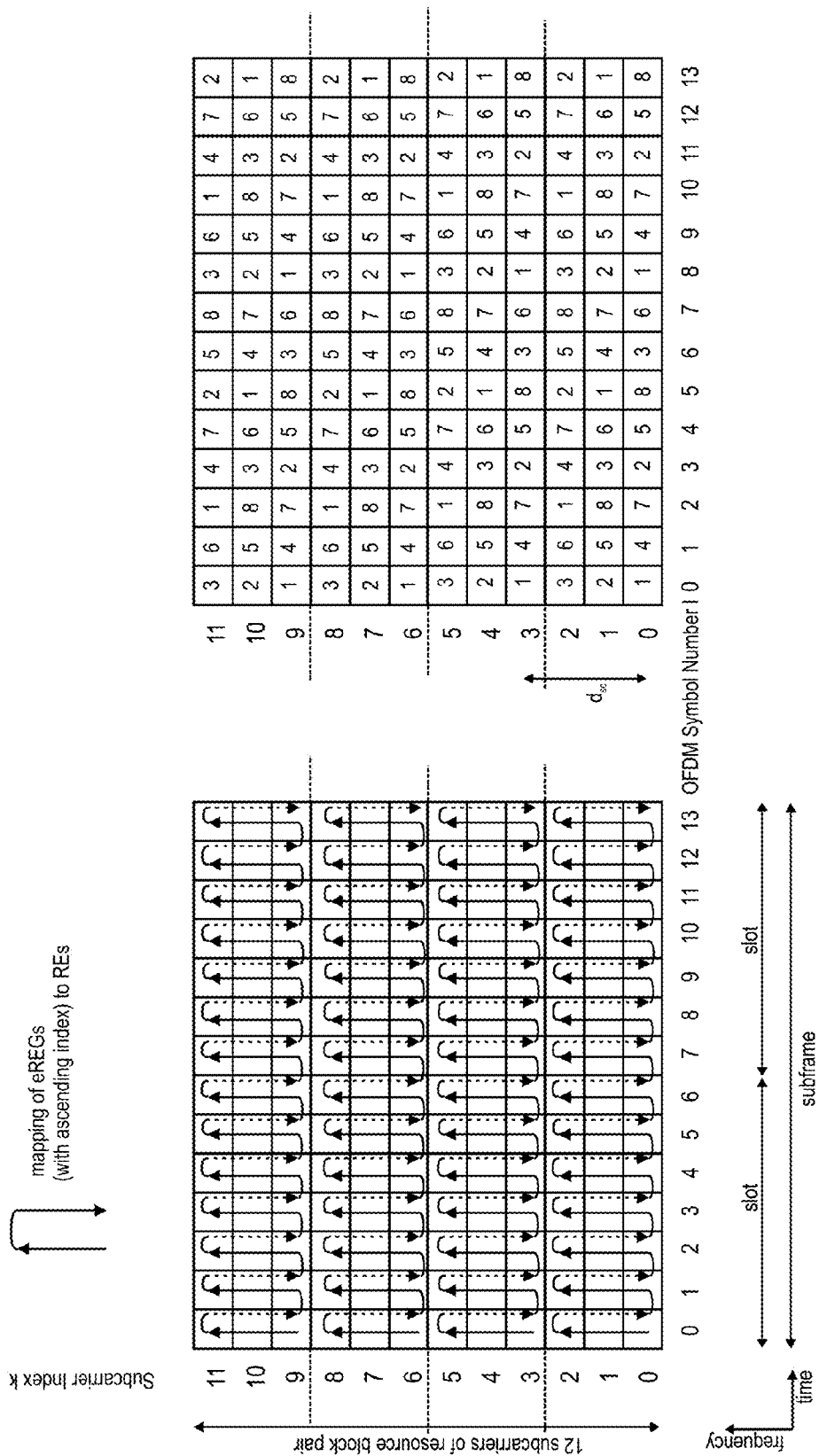

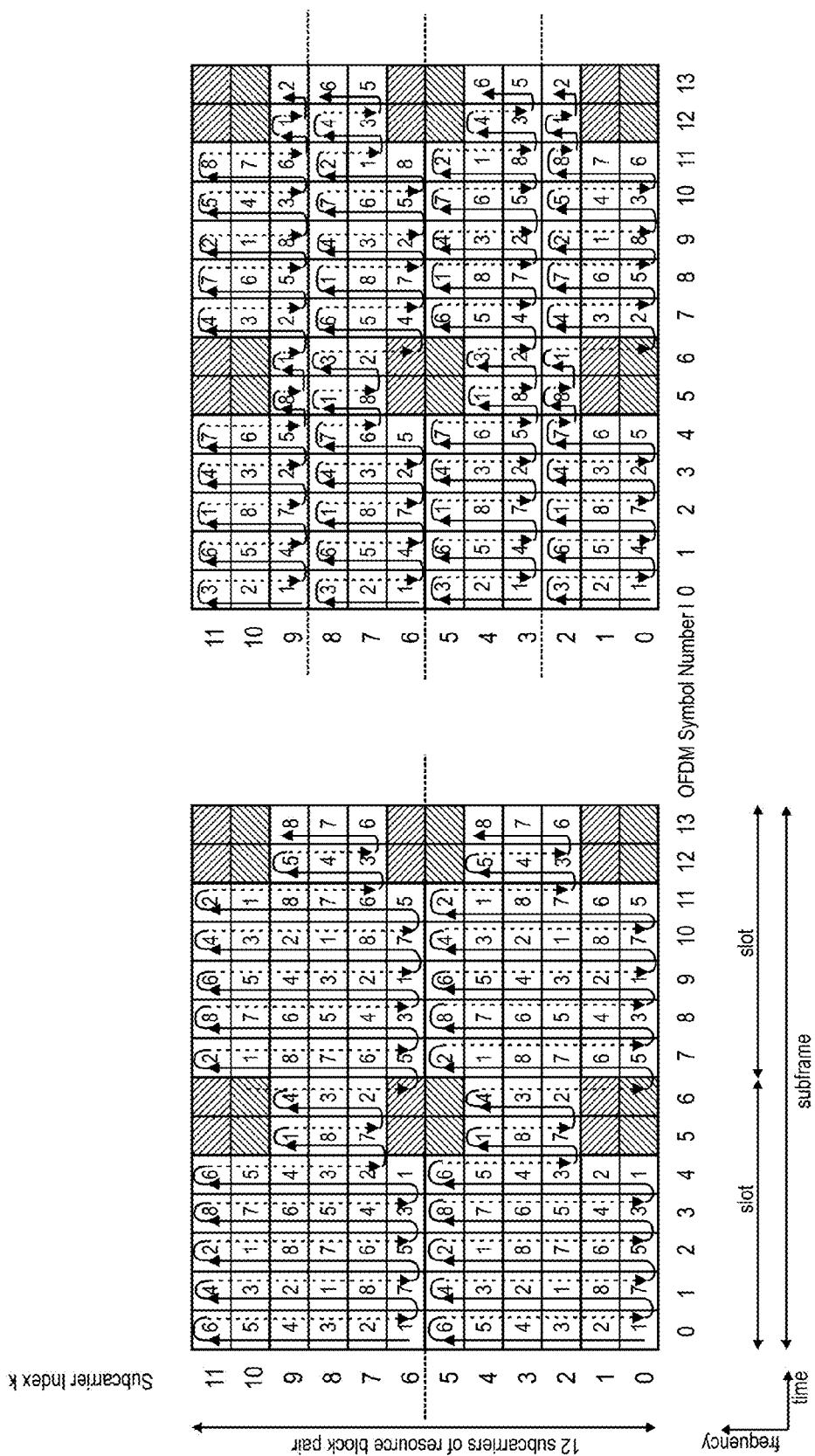

COMMON MAPPING OF RESOURCE ELEMENTS TO ENHANCED RESOURCE ELEMENT GROUPS

BACKGROUND

Technical Field

The invention relates to methods for assigning resource elements to various enhanced resource element groups. The invention is also providing the user equipment for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the sub-frames. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information. For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference. The different DCI formats that are currently defined for LTE are as follows and described in detail in 3GPP TS 36.212, "Multiplexing and channel coding", section 5.3.3.1 (available at http://www.3gpp.org and incorporated herein by reference).

Physical Downlink Control Channel (PDCCH) and Physical Downlink Shared Channel (PDSCH)

The physical downlink control channel (PDCCH) carries e.g. scheduling grants for allocating resources for downlink or uplink data transmission.

Each PDCCH is transmitted using one or more so called Control Channel Elements (CCEs). Each CCE corresponds to a set of Resource Elements (REs). In 3GPP LTE, at the moment one CCE consists of 9 Resource Element Groups (REGs), where one REG consists of four consecutive REs (consecutive in the frequency domain) excluding potential REs of reference signals. The resource elements occupied by reference symbols are not included within the REGs, which means that the total number of REGs in a given OFDM symbol depends on whether or not reference signals are present.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH}=2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

There are two special cases: in subframes containing MBSFN transmissions there may be 0, 1 or 2 symbols for control signaling, while for narrow system bandwidths (less than 10 resource blocks) the number of control symbols is increased, maybe to 2, 3 or 4, to ensure sufficient coverage at the cell border.

For a downlink grant on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

In 3GPP LTE a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a subframe.

On a transport channel level, the information transmitted via the PDCCH is also referred to as L1/L2 control signaling. L1/L2 control signaling is transmitted in the downlink for each user equipment (UE). The control signaling is commonly multiplexed with the downlink (user) data in a subframe (assuming that the user allocation can change from subframe to subframe).

The physical downlink shared channel (PDSCH) is mapped to the remaining OFDM symbols within one subframe that are not occupied by the PDCCH. The PDSCH resources are allocated to the user equipments in units of resource blocks for each subframe.

FIG. 5 shows the exemplary mapping of PDCCH and PDSCH within a normal subframe (having $2 \cdot N_{symb}^{DL}=14$ OFDM symbols in the time domain), respectively a resource block pair (see magnification). In this exemplary case, the first $N_{symb}^{PDCCH}=2$ OFDM symbols (PDCCH region) are used for L1/L2 control signaling, i.e. for signaling the PDCCH, and the remaining $N_{symb}^{PDSCH}=12$ OFDM symbols (PDSCH region) are used for data. Within the resource block pairs of all subframes, cell-specific reference signals, CRS (Common Reference Signal), are transmitted. These cell-specific reference signals are transmitted on one or several of antenna ports 0 to 3. In this example, the CRS are transmitted from two antenna ports: R0 is from antenna port 0 and R1 is from antenna port 1.

FIG. 6 shows another example where the PDCCH and the PDSCH is mapped to a MBSFN subframe. The example of FIG. 6 is quite similar to FIG. 5, except for the MBSFN subframe not comprising common reference signals in OFDM symbols outside of the control channel region.

FIG. 7 illustrates a resource block pair and the CRS for antenna ports 0 to 3, as defined in the technical standard TS 36.211v10.4 Chapter 6.10, incorporated herewith by reference; in particular FIG. 6.10.1.2-1 where a normal cyclic prefix is assumed.

Release 10 introduces extensive support of UE-specific reference signals for demodulation of up to 8 layers corresponding to up to 8 antenna ports (in LTE Release 10, antenna ports 7-14). Correspondingly, the subframe also contains UE-specific reference signals, such as DMRS (De-Modulation Reference Signal) that are used by the user equipments for demodulating the PDSCH. The DMRS are only transmitted within the resource blocks where the PDSCH for a certain user equipment is allocated. In the example of FIG. 8A, only DMRS ports 7-10 are shown since these are assumed to be sufficient for ePDCCH transmissions. It should be noted that at the moment it is not supported to use DMRS for the PDSCH when also using SFBC.

In addition, feedback of Channel-State-Information (CSI) is based on a set of reference signals—CSI reference signals (CSI-RS) which are relatively sparse in frequency but regularly transmitted from all antennas at the base station, while in general the UE-specific reference signals are denser in frequency but only transmitted when data is transmitted on the corresponding layer (see FIG. 8B). The CSI reference signal is transmitted in each physical antenna port or virtualized antenna port and is used for measurement purposes only.

A cell can be configured with one, two, four or eight CSI-RS ports. The exact CSI-RS structure, including the exact set of resource elements used for CSI-RS in a resource block, depends on the number of CSI-RS configured within the cell and may also be different for different cells. More specifically, within a resource-block pair there are 40 possible positions for the reference symbols of CSI-RS and, in a given cell, a subset of corresponding resource elements is used for CSI-RS transmission. In LTE Release 10, the CSI-RS are transmitted (if configured) on one or more of antenna ports 15-22.

FIGS. 8A and 8B illustrate the reference signals DMRS and CSI-RS for a resource block pair, according to one example.

For further information on the LTE physical channel structure in downlink and the PDSCH and PDCCH format, see St. Sesia et al., "LTE—The UMTS Long Term Evolution", Wiley & Sons Ltd., ISBN 978-0-47069716-0, April 2009, sections 6 and 9. Additional information on the use of reference signals and channel estimation in 3GPP LTE can be found in section 8 of this book.

FIGS. 9 and 10 illustrate an exemplary mapping of resource elements to resource element groups within a physical resource block pair. As apparent therefrom, one resource element group comprises four adjacent resource elements within each OFDM symbol. Further, the resource elements that are used for the common reference signals are not used for defining a resource element group; in other words, when assigning the resource elements to resource element groups, the CRS REs are accounted for. Therefore, depending on the position of the CRS in the first OFDM symbol (which is cell specific), the mapping of REs to REGs is different. In particular, when comparing FIGS. 9 and 10, in the first OFDM symbol 0 the REs of subcarriers 0, 1, 3, 4, 6, 7 and 9, 10, the differences are apparent; e.g. resource element of subcarrier 1 and OFDM symbol 0, may be either assigned to REG 1 (FIG. 9) or may be used instead as a CRS (FIG. 10).

Space-Frequency Block Codes (SFBCs)

SFBC is a transmit diversity technique used in LTE. In LTE, transmit diversity is only defined for 2 and 4 transmit antennas and one data stream, referred to in LTE as one codeword since one transport block CRC is used per data stream. To maximize diversity gain the antennas typically need to be uncorrelated, so they need to be well separated relative to the wavelength or have different polarization. The SFBC diversity scheme may be used in LTE for the PBCH and PDCCH, and also for the PDSCH if it is configured in transmit diversity mode for a UE.

More specifically with regard to SFBC, if a physical channel in LTE is configured for transmit diversity operation using two eNodeB antennas, pure SFBC is used. SFBC is a frequency domain version of the well-known Space-Time Block Codes (STBCs), also known as Alamouti code. This family of codes is designed so that the transmitted diversity streams are orthogonal and achieve the optimal SNR with a linear receiver. Such orthogonal codes only exist for the case of two transmit antennas. Multiple subcarriers of OFDM lend themselves well to the application of SFBC.

For SFBC transmission in LTE, the symbols transmitted from the two eNodeB antenna ports on each pair of adjacent subcarriers are defined as follows:

$$\begin{bmatrix} y^{(0)}(1) & y^{(0)}(2) \\ y^{(1)}(1) & y^{(1)}(2) \end{bmatrix} = \begin{bmatrix} x_1 & x_2 \\ -x_2^* & x_1^* \end{bmatrix}$$

whereby $y^{(p)}(k)$ denotes the symbols transmitted from antenna port p on the $k^{th}$ subcarrier.

SFBC achieves robustness through frequency diversity by using different subcarriers for the repeated data on each antenna. Basically, an information symbol is transmitted on two different resource elements by using two distinct antennas (spatial component). Provided that the channel coefficient (amplitude/phase) for both versions is the same, the receiver can calculate the original symbol exploiting a diversity gain.

As mentioned above, the two versions of the information symbol are transmitted on adjacent subcarriers to be spaced closely in frequency; in said case, the channel coefficient for both versions can be assumed to be basically the same which improves the accurate regeneration of the information symbol using a simple receiver implementation, as shown by S. M. Alamouti "A Simple Transmitter Diversity Technique for Wireless Communication", IEEE Journal on Selected Areas in Communications, Vol. 16, pp. 1451-1458, October 1998.

FIGS. 11 and 12 are similar to FIGS. 9 and 10 respectively, as far as both illustrate the RE-to-REG mapping for the PDCCH considering the different positioning of the CRS. Furthermore, FIGS. 11 and 12 also illustrate how SFBC may be applied to the PDCCH and to the PDSCH.

For the PDCCH, LTE works such that the SFBC pairs are located as adjacent as possible in the frequency domain within one OFDM symbol; as depicted in FIG. 11, 12 in OFDM symbol 0 the possible SFBC pairs are each shown in a dashed-line box. SFBC pairs can therefore be mapped to resource elements (k',l') and (k'+n,l') in the same OFDM symbol, where k' is the subcarrier index, l' is the OFDM symbol number and n∈{1, 2}. In other words, n=1 means that the SFBC pair is located at adjacent resource elements; n=2 means that the SFBC pair is located at resource elements that are spaced apart by two, i.e. one resource element (such as a CRS RE) in between. Therefore, the spacing is equivalent to 1 plus the number of REs between two REs forming an SFBC pair.

Similarly, with regard to the PDSCH, SFBC pairs can be mapped to resource elements (k',l') and (k'+n,l') in the same OFDM symbol, where k' is the subcarrier index, l' is the OFDM symbol number and n∈{1, 2}. In other words, n=1 means that the SFBC pair needs to be adjacent resource elements; n=2 means that the SFBC pair may be of resource elements that are spaced apart by two, i.e. one resource element (such as a CRS RE) in between. FIG. 11 exemplary discloses SFBC pairs in dashed-line boxes in OFDM symbol 1 and 6 for n=1, and FIG. 12 in the PDCCH region exemplary illustrates SFBC pairs in dashed-line boxes for n=2.

LTE also allows a transmit diversity approach known as a combination of frequency switched transmit diversity (FSTD) with SFBC. FSTD schemes transmit symbols from each antenna on a different set of subcarriers. More information on FSTD is given in Chapter 11.2.2.1 of LTE—The UMTS Long Term Evolution—From Theory to Practice, Edited by Stefanie Sesia, Issam Toufik, Matthew Baker, Chapter 9.3, incorporated herein by reference.

Enhanced-PDCCH

Currently under discussion is to introduce an Enhanced PDCCH (ePDCCH), which is transmitted based on UE-specific reference signals. In order to efficiently use UE-specific reference signals, the mapping of Enhanced-PDCCH is preferred to be allocated in the PDSCH region, as depicted in FIG. 13. In order not to blind-decode the whole bandwidth, it is assumed that the search space of ePDCCH would be limited within a set of PRBs pairs. The set of PRBs pairs can be first configured by higher layer signaling, or at least is assumed to be known by the receiver prior to trying to detect any ePDCCH.

Details for the ePDCCH are currently under discussion and thus not yet decided. Therefore, the following assumptions are made as examples only for illustration and explanatory purposes. In general it may be assumed that a similar approach will be used as for the PDCCH. For example, it may be assumed that the ePDCCH consists of an aggregation of one or more control channel elements; in the following they may be exemplary called Enhanced Control Channel Elements (eCCEs). Furthermore, an eCCE may be formed from resource element groups that are mapped to resource elements in the time/frequency grid; they may be exemplary called Enhanced Resource Element Groups (eREGs).

FIG. 13 schematically discloses the subframe content regarding PDCCH, ePDCCH and PDSCH, and further illustrates that for the ePDCCH 8 different eREG are exemplary assumed.

At present, there is no agreed definition as to how the resource element to resource element group mapping is going to be for the ePDCCH being in the PDSCH region.

The RE-to-eREG mapping for the ePDCCH (i.e. generally within or at least including REs from the PDSCH region) should allow for a SBFC transmission to achieve diversity, and advantageously should furthermore allow the application of the same mapping regardless of whether a diversity transmission is utilized or not.

BRIEF SUMMARY

One object of the invention is to propose such a mapping of resource elements to resource element groups that also applies to the ePDCCH.

The object is solved by the subject matter of the independent claims. Advantageous embodiments are subject to the dependent claims.

According to a first aspect, resource elements (REs) of a resource block pair are assigned to enhanced resource elements groups (eREGs), where the assigning is such that it is universal (i.e. applies to a resource block pair irrespective of the reference signals blocking a resource element), in order to not be specific for a particular UE or cell. Further, the mapping is such that it considers the possible positioning of the reference signals in the resource block pair, so as to minimize the impact caused by the reference signals when using SFBC.

The mapping is performed sequentially for each OFDM symbol of the resource block pair, and assigns the REs in each OFDM symbol to sequential eREGs (i.e. eREGs with a predetermined order of indices); the eREGs are cyclically extended such that an eREG 0 follows an eREG $m_{max}$, where $m_{max}$ is the total number of eREGs for the resource block pair. Furthermore, the REs in each OFDM symbol are assigned in groups of two REs to the eREGs, where these two REs are spaced apart by either 3 or 6 subcarriers in the frequency domain; this is done until all REs of the OFDM symbol are assigned and then for each OFDM symbol.

The 3 or 6 subcarrier spacing used for the mapping is due to the fact that this spacing corresponds to the spacing used for possible reference signals in the resource block pair. By using said spacing, the reference signals block REs that are assigned to the same eREG, thus avoiding that REs are lost for SFBC when only one of the REs forming an SFBC pair is being blocked by a reference signal.

The present invention provides a method for assigning resource elements to resource element groups in a communication system using OFDM, Orthogonal Frequency-Division Multiplexing. The resource elements of a resource block pair are assigned to a plurality of m resource element groups according to a mapping that applies to each of a first and second frequency domain half of the resource block pair as follows: The resource elements of the first OFDM symbol are assigned to the resource element groups, in a first predetermined order of the resource elements and a second predetermined order of the resource element groups. The resource elements of the second OFDM symbol and of each further of the remaining OFDM symbols in the resource block pair are assigned to the resource element groups, in the first predetermined order of the resource elements and in the second predetermined order of the resource element groups, such that the first resource element group to be assigned is the one subsequent-in-order to the resource element group last assigned for the previous OFDM symbol.

According to an advantageous embodiment of the invention which can be used in addition or alternatively to the above, the first and second predetermined order is either an ascending or descending order.

According to an advantageous embodiment of the invention which can be used in addition or alternatively to the above, the assigning of resource elements to resource element groups is cyclic with respect to the resource element groups, such that the resource element group being last according to the second predetermined order is followed by the resource element group being first according to the second predetermined order.

According to an advantageous embodiment of the invention which can be used in addition or alternatively to the above, the ascending/descending order of the resource element groups starts with one out of the resource element groups, preferably with the first/last resource element group in the ascending/descending order.

According to an advantageous embodiment of the invention which can be used in addition or alternatively to the above, a resource element spans one subcarrier in a frequency domain and one OFDM symbol in the time domain, wherein a resource block pair spans 12 subcarriers in the frequency domain and 12 or 14 OFDM symbols in the time domain.

According to an advantageous embodiment of the invention which can be used in addition or alternatively to the above, the total number of resource element groups per resource block pair is 3, 4, 6 or 8. Preferably, the total number of resource element groups per resource block pair is a multiple of the number of resource element groups that form a control channel element.

According to an advantageous embodiment of the invention which can be used in addition or alternatively to the above, the mapping is a universal mapping for the resource block pairs used in a OFDM communication system, such that the mapping applies independent from reference signals being assigned to some of the resource elements in the resource block pair. Put differently, in the mapping each resource element of the resource block pair is assigned to one of the plurality of resource element groups.

According to an advantageous embodiment of the invention which can be used in addition or alternatively to the above, a mobile terminal determines whether a velocity of the mobile terminal exceeds a predetermined velocity threshold. If the velocity threshold is exceeded, disregarding the resource elements of OFDM symbols of index 0 to ≤lr in a resource block pair, where lr is either 4, 3, 2 or 1. The embodiment may further transmit, if the velocity threshold is exceeded, by the mobile terminal information to the base station about lr.

According to an advantageous embodiment of the invention which can be used in addition or alternatively to the above, the step of disregarding the resource elements comprises the step of setting the log-likelihood ratio of the resource elements of the OFDM symbols of index 0 to ≤lr to zero.

According to an advantageous embodiment of the invention which can be used in addition or alternatively to the above, a base station determines whether a velocity of the mobile terminal exceeds a predetermined velocity threshold. If the velocity threshold is exceeded, the resource elements of OFDM symbols of index 0 to ≤lr in a resource block pair are transmitted with zero power, where lr is either 4, 3, 2 or 1. The embodiment may further comprise the step of informing the mobile terminal about lr, if the velocity threshold is exceeded.

According to an advantageous embodiment of the invention which can be used in addition or alternatively to the above, the mapping refers to an enhanced Physical Downlink Control Channel, and the plurality of resource element groups is a plurality of enhanced resource element groups.

According to an advantageous embodiment of the invention which can be used in addition or alternatively to the above, space-frequency block coding, SFBC, is used for transmitting resource element groups in a resource block pair. One out of a plurality of SFBC pairs is defined to use two resource elements of the same resource element group within each OFDM symbol, the two resource elements of the SFBC pair being spaced apart either by 3 or 6 resource elements in the frequency domain.

According to an advantageous embodiment of the invention which can be used in addition or alternatively to the above, if one of the two resource elements of the SFBC pair is used for transmitting a reference signal, the other resource element of the SFBC pair is not used for the SFBC transmission.

According to an advantageous embodiment of the invention which can be used in addition or alternatively to the above, the mapping for one resource block pair is performed according to the following:

$$m(k', l') = ((k' \mod d_{sc}) + f(l')) \mod m_{max} + 1$$

$$f(l') = \begin{cases} m(t-1, l'-1) + 1 & l' > 0 \\ 0 & l' = 0 \end{cases}$$

wherein m(k',l') is the function to determine the resource element group m for a resource element at position (k', l'), where $m_{max}$ is the total number of resource element groups to be assigned for the resource block pair, with m{1,2, ... $m_{max}-1$, $m_{max}$}. k' is the subcarrier index within the resource block pair with k'{0, 1, 2 ... 10 11}, and wherein l' is the OFDM symbol index within the resource block pair with l'{0, 1, 2 ... 11, 12} or l'{0, 1, 2 ... 13, 14}, where $d_{sc}$ is either 3 or 6, wherein t is $N_{sc}^{RB}$ or ($N_{sc}^{RB}/2$), wherein $N_{sc}^{RB}$ is the number of subcarriers per resource block and is preferably 12. The two resource elements of the SFBC pair are spaced apart either by $d_{sc}$ in the frequency domain.

According to an advantageous embodiment of the invention which can be used in addition or alternatively to the above, the at least two resource element groups form a control channel element, and preferably wherein the indexes of the at least two resource element groups forming the control channel element are different.

The invention further provides a terminal for receiving control channel information based on resource element groups, where resource elements are assigned to resource element groups in a communication system using OFDM, Orthogonal Frequency-Division Multiplexing. The resource elements of a resource block pair are assigned to a plurality of m resource element groups according to a mapping that applies to each of a first and second frequency domain half of the resource block pair, wherein the mobile terminal comprises a processor to apply the mapping where:

the resource elements of the first OFDM symbol are assigned to the resource element groups, in a first predetermined order of the resource elements and a second predetermined order of the resource element groups, the resource elements of the second OFDM symbol and of each further of the remaining OFDM symbols in the resource block pair are assigned to the resource element groups, in the first predetermined order of the resource elements and in the second predetermined order of the resource element groups, such that the first resource element group to be assigned is the one subsequent-in-order to the resource element group last assigned for the previous OFDM symbol.

According to an advantageous embodiment of the invention which can be used in addition or alternatively to the above, a processor applies the mapping for receiving at least one resource element group as follows: the association for the at least one resource element group is determined by applying the mapping resulting explained in any of the above embodiments. Preferably, a receiver and processor are adapted to decode at least one ePDCCH based on the eREG-to-RE mapping of the corresponding eREGs that form the ePDCCH.

BRIEF DESCRIPTION OF THE SEVERAL VIEWS OF THE DRAWINGS

In the following the invention is described in more detail with reference to the attached figures and drawings.

FIGS. 8A & 8B illustrate the reference signals DMRS and CRS in a resource block pair, FIGS. 9 & 10 illustrate the resource element to resource element group mapping for the PDCCH region, differing depending on the positioning of the common reference signals in OFDM symbol 1, FIGS. 11 & 12 are similar to FIGS. 9 & 10, except that some of the possible SFBC pairs for the PDCCH and PDSCH are respectively illustrated, FIG. 22 illustrates the mapping rule of an advantageous RE-to-eREG mapping according to an embodiment of the invention, FIG. 23 illustrates the RE-to-eREG mapping result for the PDCCH and PDSCH region according to the embodiment of FIG. 22, FIG. 31 illustrates the RE-to-eREG mapping rule according to a further embodiment of the invention, where the spacing between two resources elements assigned to the same eREG in an OFDM symbol is 3, FIG. 32 illustrates the result of the RE-to-REG mapping for the PDCCH and PDSCH region according to the embodiment of FIG. 31, FIG. 33 illustrates the RE-to-eREG mapping according to another embodiment of the invention, FIG. 34 illustrates the RE-to-eREG mapping according to still another embodiment of the invention, but similar to the embodiment of FIG. 33.

DETAILED DESCRIPTION

Figure 1:
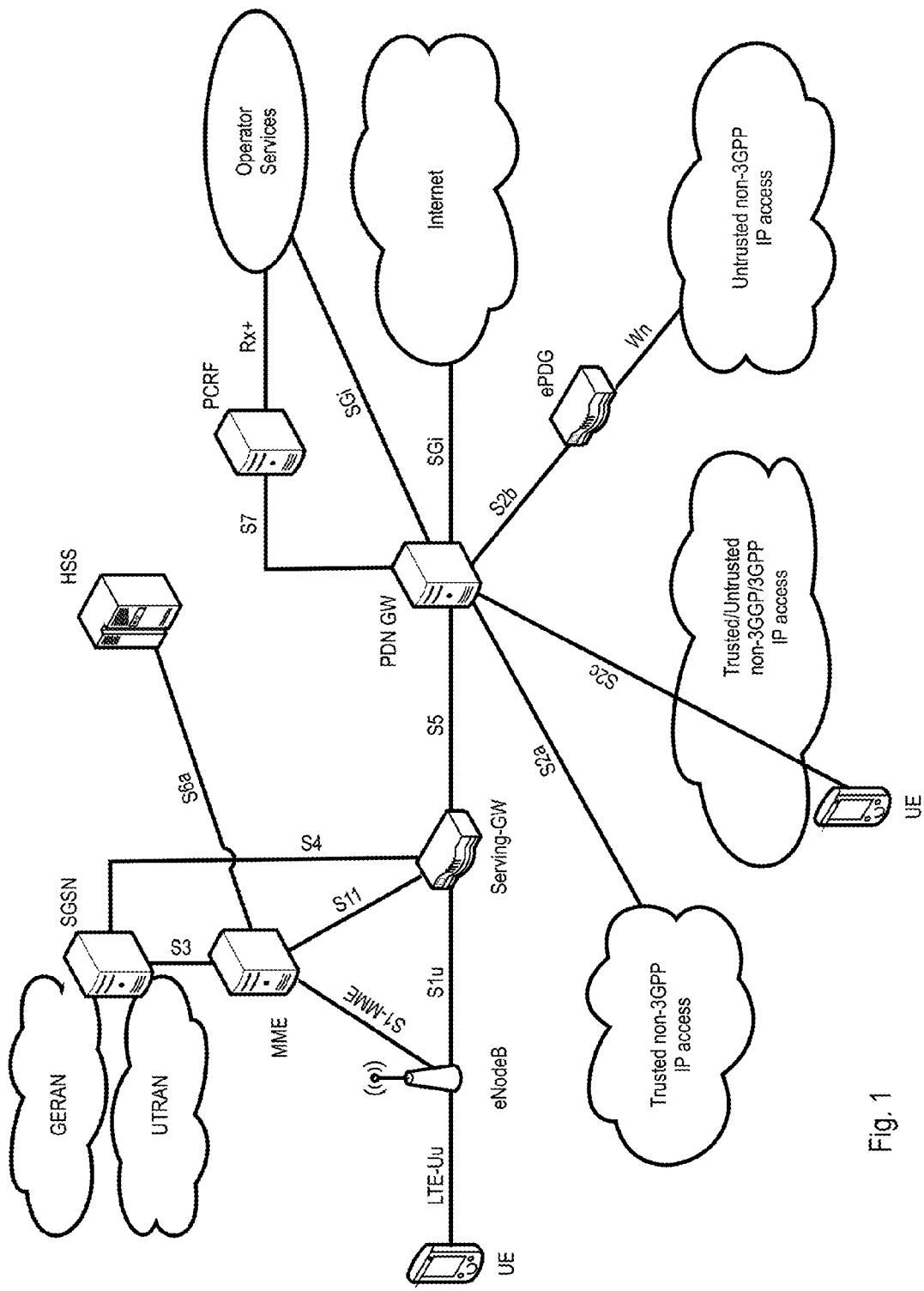
FIG. 1 shows an exemplary architecture of a 3GPP LTE system.
Figure 2:
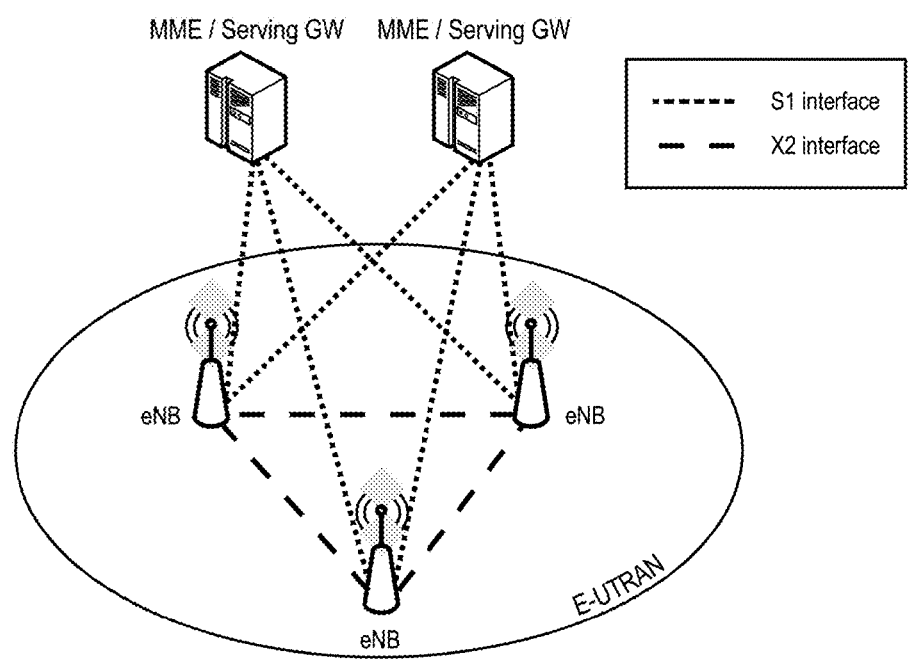
FIG. 2 shows an exemplary overview of the overall E-UTRAN architecture of 3GPP LTE.
Figure 3:
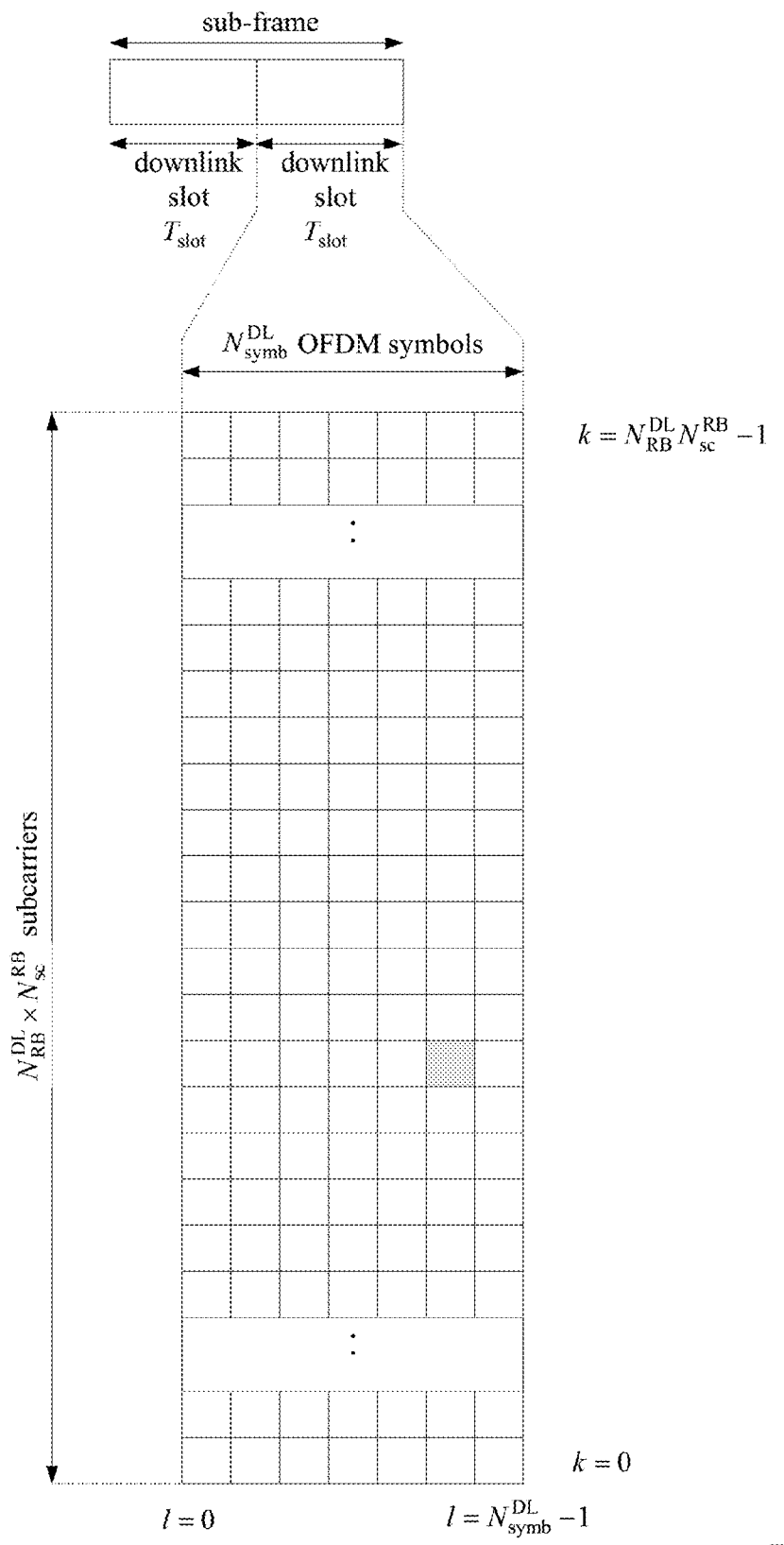
FIG. 3 shows exemplary subframe boundaries on a downlink component carrier as defined for 3GPP LTE (Release 8/9)
Figure 4:
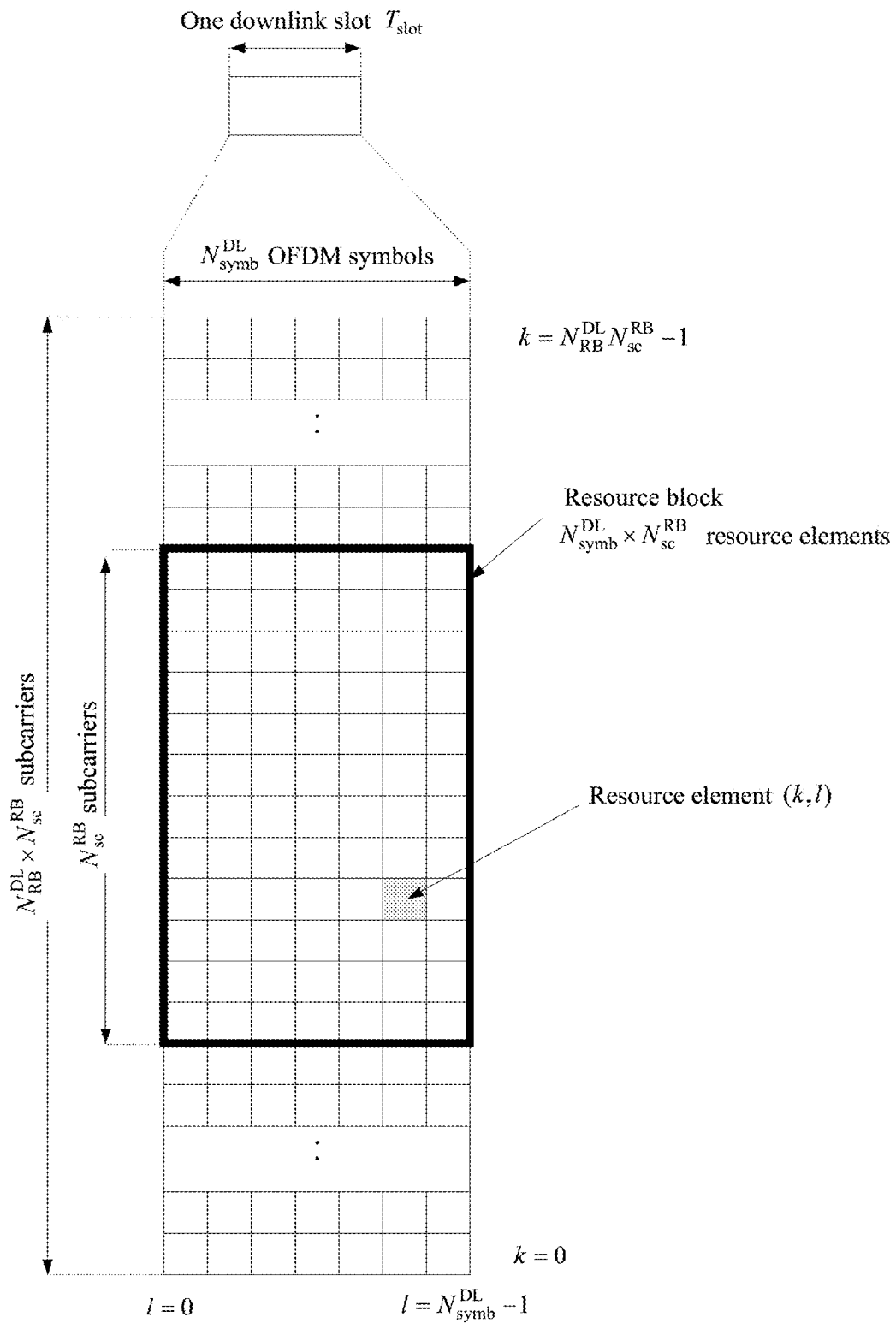
FIG. 4 shows an exemplary downlink resource grid of a downlink slot as defined for 3GPP LTE (Release 8/9), FIGS. 5 & 6 exemplify the structure of a normal subframe, respectively a MBSFN sub-frames and a physical resource block pair thereof, as defined for 3GPP LTE (Release 8) and 3GPP LTE-A (Release 10)
Figure 5:
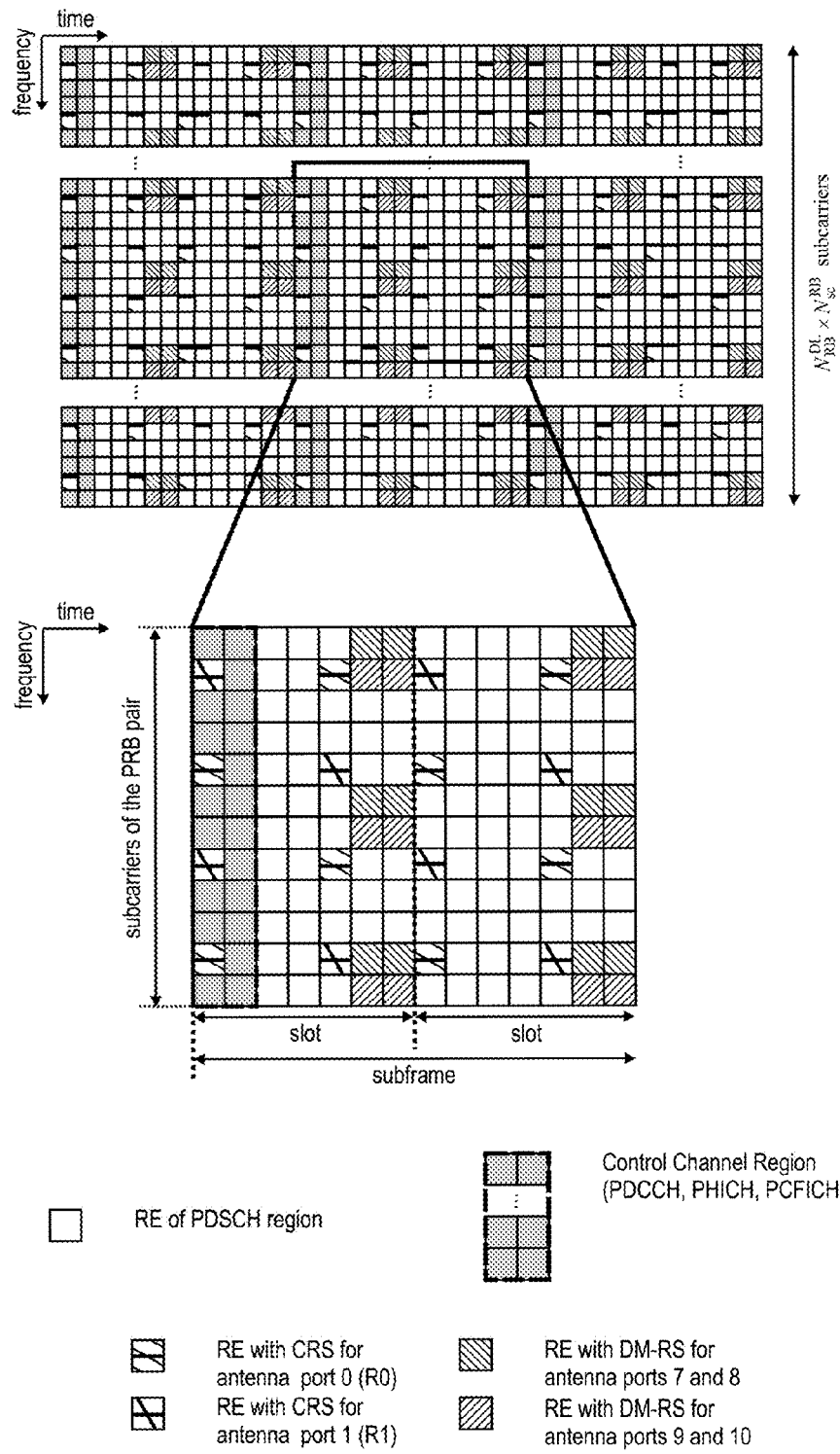
Figure 6:
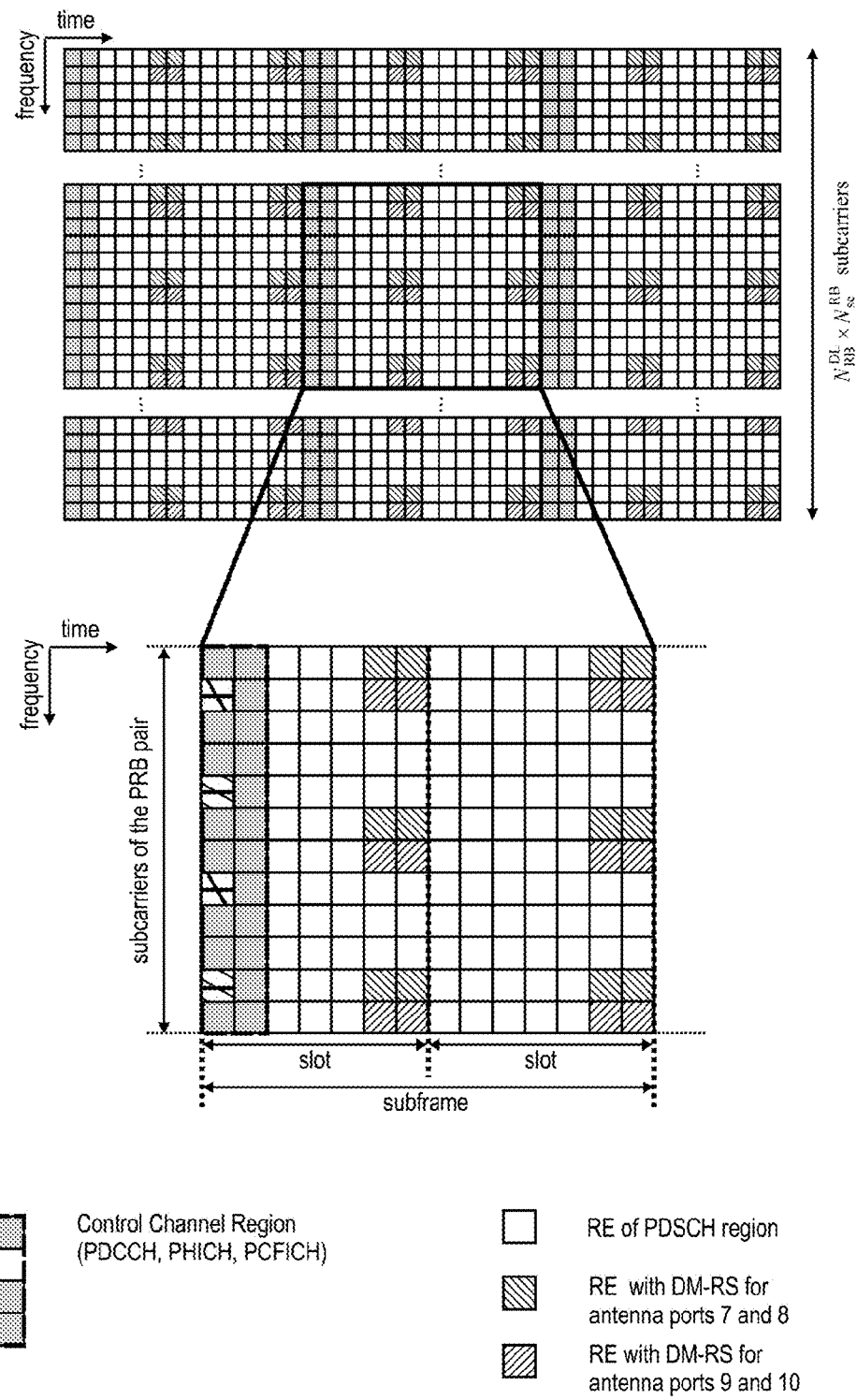

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 10/11) communication systems as described in the Technical Background section above, but the invention is not limited to its use in this particular exemplary communication networks.

The term "frequency domain half" used throughout the claims refers to a part of the resource block, the "frequency domain half" spanning either the first or last 6 subcarriers for all OFDM symbols of a resource block pair, when a physical resource block spans 12 subcarriers in the frequency domain, as is assumed in this description without loss of generality.

The term "spaced apart" used throughout the claims refers to the distance between two resource elements in the frequency domain, and shall be used as follows. A resource element with the subcarrier index k is spaced apart by 3 resource elements with regard to the resource element with the subcarrier index k+3.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The following definitions are used throughout the description.

k, or k' is the subcarrier index, with k, k'$\in\{0,1,2 \ldots 10,11\}$ l, or l' is the OFDM symbol number, with l, l'$\in\{0,1,2 \ldots 12, 13\}$ for a normal cyclic prefix or with l, l'$\in\{0,1,2 \ldots 10, 11\}$ for an extended cyclic prefix (k,l) identifies the resource element at subcarrier k and OFDM symbol l; e.g. (4,5) refers to resource element at subcarrier 4 and OFDM symbol 5

$m_{max}$ is the number of total enhanced resource element groups, where $m_{max}$ is a positive integer number such as 1,2, . . . 9 m' is the index of the eREG$\in\{1,2, 3, 4 \ldots, m_{max}-1, m_{max}\}$;

As apparent from above, the indices of l', k' start with index 0, while the index of eREG start with 1. Of course, the particular start index is not important for the functioning of the invention. Correspondingly, a different start index may be chosen for each of l', k' and m'. Corresponding descriptions, formulas or other procedures can be easily modified by those skilled in the art to take a different indexing into account.

The following assumptions are made for exemplary purposes and to facilitate the explanations of the various embodiments of the invention.

If not defined differently, it is assumed that the PDCCH region spans the first 3 OFDM symbols, albeit it may span the first 1 or the first 2 OFDM symbols or might be not present at all (equivalent to spanning 0 OFDM symbols); correspondingly, the invention should not be restricted to a PDCCH region of 3 OFDM symbols but applies accordingly to different PDCCH regions of 1 and 2 OFDM symbols, or even a non-present PDCCH region (equivalent to a size of 0 OFDM symbols).

Normal cyclic prefix is assumed if not mentioned differently, where the subframe has 14 OFDM symbols and not 12 OFDM symbols as with the extended cyclic prefix; the invention should not be restricted to a subframe of 14 OFDM symbols, since the principles of the invention apply accordingly to a subframe of 12 OFDM symbols.

The embodiments of the invention are often described with a total number of 8 eREGs; this should not be construed as restricting the invention to a total number of eREGs of 8, but any other number of eREG can be used.

As will be explained, the embodiments refer to a mapping rule that assigns sequential resource elements to sequential enhanced resource element groups; the assigning follows a particular order. In most of the embodiments an ascending order is assumed. However, this is not necessary; instead, a descending order may be used, or any other predetermined order.

Also with regard to the sequential assigning according to a predetermined order: in most of the embodiments, the assigning of REs is started with the first index of the subcarriers (k'=0), OFDM symbols (l'=0) and the first index of the eREGs (m'=1). This should not be understood as restricting the invention to only those examples; rather, the assigning may also start at different indices of the subcarriers, OFDM symbols and eREGs, especially in combination with ascending and/or descending orders. For example, when using a descending order regarding the subcarriers, OFDM symbols and eREGs, the assigning could start at indeces k'=11, l'=13, m'=8.

It is assumed that one eCCE consists of two eREGs. At least two eREGs are required in order to enable a distributed transmission as outlined later in this document. With the numerology of 12 subcarriers and 12 or 14 OFDM symbols per PRB pair, and the typical sizes of an L1/L2 control signaling payload as defined in LTE, a preferred solution that offers a good tradeoff between granularity and management complexity is offered by splitting the PRB pair into 8 eREGs, and to combine two eREGs into one eCCE which is the smallest unit for an L1/L2 control signaling transmission. For example, a small L1/L2 control signaling size in a 10 MHz LTE cell can be around 30 bits, while a large L1/L2 control signaling size in a 10 MHz LTE cell can be around 60 bits, and a typical size is around 45 bits. As the L1/L2 control signaling is usually FEC encoded and transmitted using a QPSK modulation, each used RE can carry 2 bits. Consequently, if an eCCE includes around 30 REs, this is equivalent to 60 codebits, which results for the typical L1/L2 control signaling size in a code rate of 3/4, which can be seen as a coderate that is suitable for good channel conditions. As will be shown later, in many cases two eREGs as defined here will offer around 30 REs, so that the definition of 2 eREGs per eCCE seems attractive and preferred. It should however be understood that a different number of eREGs per eCCE can be chosen without affecting the generality of the eREG-to-RE mapping of the present invention.

It is further assumed that one eREG is mapped to REs of one PRB pair. Then, combining at least two eREGs allows a distributed transmission, as outlined later in this document. In case that for example only one eREG forms an eCCE, then it may be preferred to allow the mapping of a single eREG to multiple PRB pairs. It may further be beneficial to allow a larger distribution for any number of eREGs in an eCCE; for example, if two eREGs form an eCCE and one eREG is mapped to only a single PRB pair, the distributed transmission on in total two different PRB pairs obtains a diversity order of two. However, if in the same case each eREG is mapped to two PRB pairs, then each eREG obtains a diversity order of two, so that the combination of two eREGs can obtain a diversity order of up to four. Therefore, it should not be construed that the present invention is limited to mapping one eREG only to REs of one PRB pair.

Figure 13:
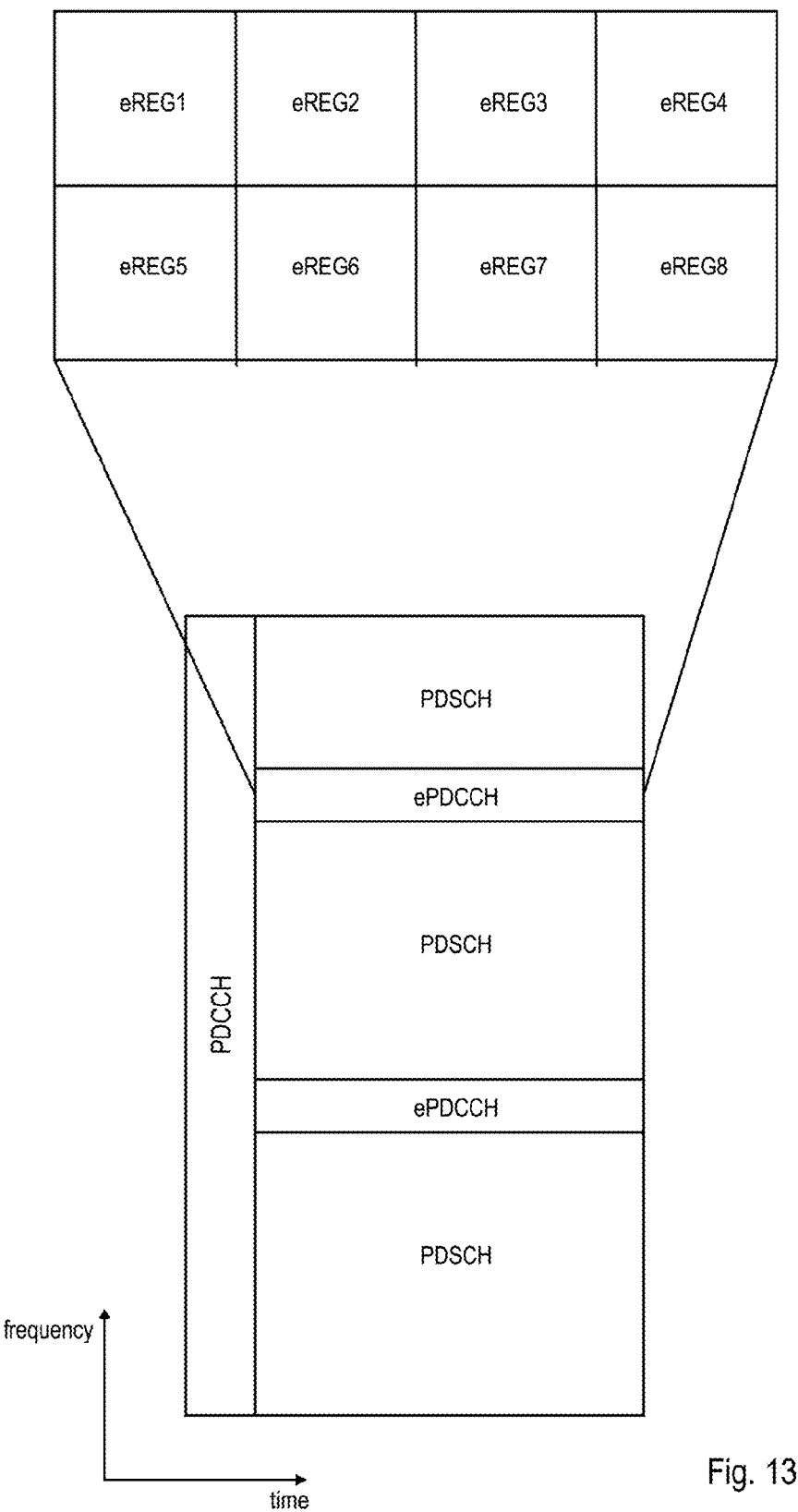
FIG. 13 is a schematic illustration of an ePDCCH in relation to the PDCCH and PDSCH.
Figures 14, 15:
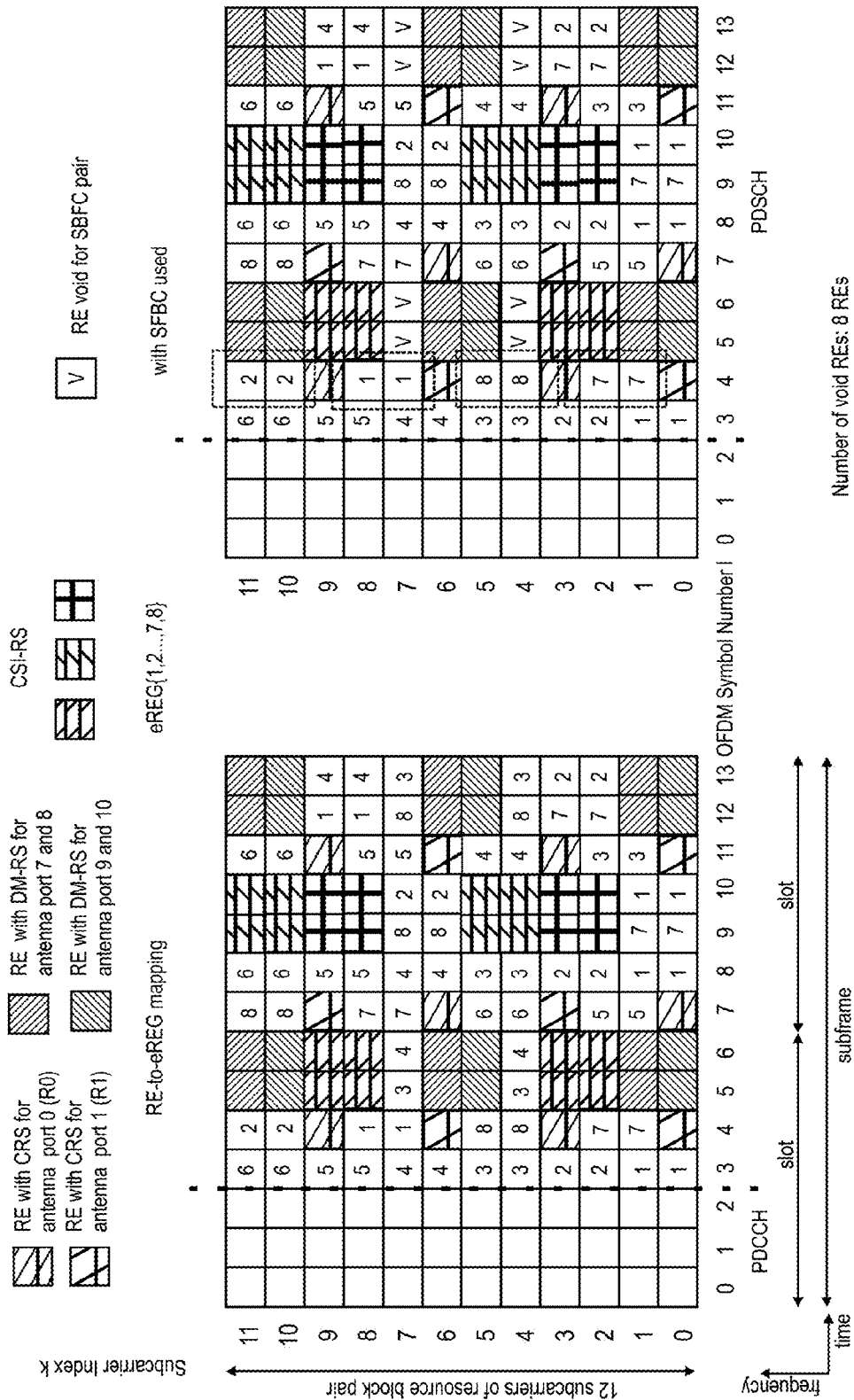
FIG. 14 illustrates the resource element to enhanced resource element group mapping for the PDSCH region.
FIG. 15 illustrates the RE-to-eREG mapping of FIG. 14, and further illustrates how SFBC transmissions are applied thereto and the resulting void resource elements for SFBC, FIGS. 16 & 17 explain an interference problem caused by the cell-specific mapping where a CRS resource element of one cell interferes with the corresponding resource element of another cell, FIGS. 18 & 19 explain the problem that the RE-to-eREG mapping is UE-specific for the same resource block pair, different UEs thus having a different understanding of which resource elements belong to which eREG.

FIG. 14 shows a resource element to enhanced resource element group mapping that is applied to the PDSCH region (assuming it starts at OFDM symbol #3), where the ePDCCH will be located. The RE-to-eREG mapping of FIG. 14 is according to the rules applied for the RE-to-REG used for the PDCCH. Thus, in the same way as for the RE-to-REG mapping in the PDCCH region (see FIG. 9 or 10), the RE-to-eREG mapping rule is such that resource elements that are used for reference signals (such as CRS, CSI-RS, DMRS) are not used for the mapping. Furthermore, in order to optimize the RE-to-eREG mapping for SFBC transmissions, it is assumed that two consecutive resource elements in an OFDM symbol are assigned to an eREG. In this exemplary mapping of FIG. 13 a total number of resource element groups of 8 is assumed, eREG∈{1,2 . . . 7,8}.

As apparent from FIG. 14, the grouping of the resource elements to an eREG is performed sequentially in groups of two resource elements to an eREG, in ascending order of the subcarriers within each OFDM symbol and then in an ascending order of OFDM symbols. It should be noted that the eREGs indices are in an ascending order and are cyclically extended such that after (in this case, assuming there are 8 eREGs) assigning eREG8 to a resource element pair, eREG1 is assigned next; this can be seen for example in OFDM symbol 4, at subcarriers 4, 5 and 7, 8. In this way all resource elements of a resource block pair, that are not used by reference signals, are assigned to an enhanced resource element group.

FIG. 15 discloses which resource elements can be used for SFBC, and which resource elements cannot be used for SFBC. As explained before, an SFCB pair in an OFDM symbol shall be composed of either adjacent resource elements of the same eREG (i.e. spaced apart by one resource element) or of resource elements of the same eREG that are spaced apart by two REs (i.e. only one resource element in between). Considering this SFBC rule, some SFBC pairs are exemplary illustrated for OFDM symbol 4 (in this case, SFBC pairs are composed of adjacent resource elements). This may be done throughout all the resource block pair, except for the resource elements of subcarriers 4 and 7, at OFDM symbols 5, 6, 12 and 13 which cannot be used for SFBC transmissions; these resource elements are indicated as void (V) in FIG. 15. Though the RE-to-eREG mapping assigned eREG 3 to the resource elements (4,5), (7,5) and eREG 4 to resource elements (4,6), (7,6), these resource elements cannot be used for SFBC transmissions since no valid SFBC pair can be formed; subcarriers 4 and 7 are spaced too far apart, i.e. more than one resource element in between. In the whole resource block pair, there are 8 void resource elements that cannot be used for SFBC transmissions (see FIG. 15).

Since the RE-to-eREG mapping rule of FIG. 14 considers the common reference signals (i.e. resource elements with common reference signals are not assigned to a eREG), the mapping algorithm is cell specific; this also applies to the RE-to-REG rule applied in the PDCCH region.

Figures 16, 17:
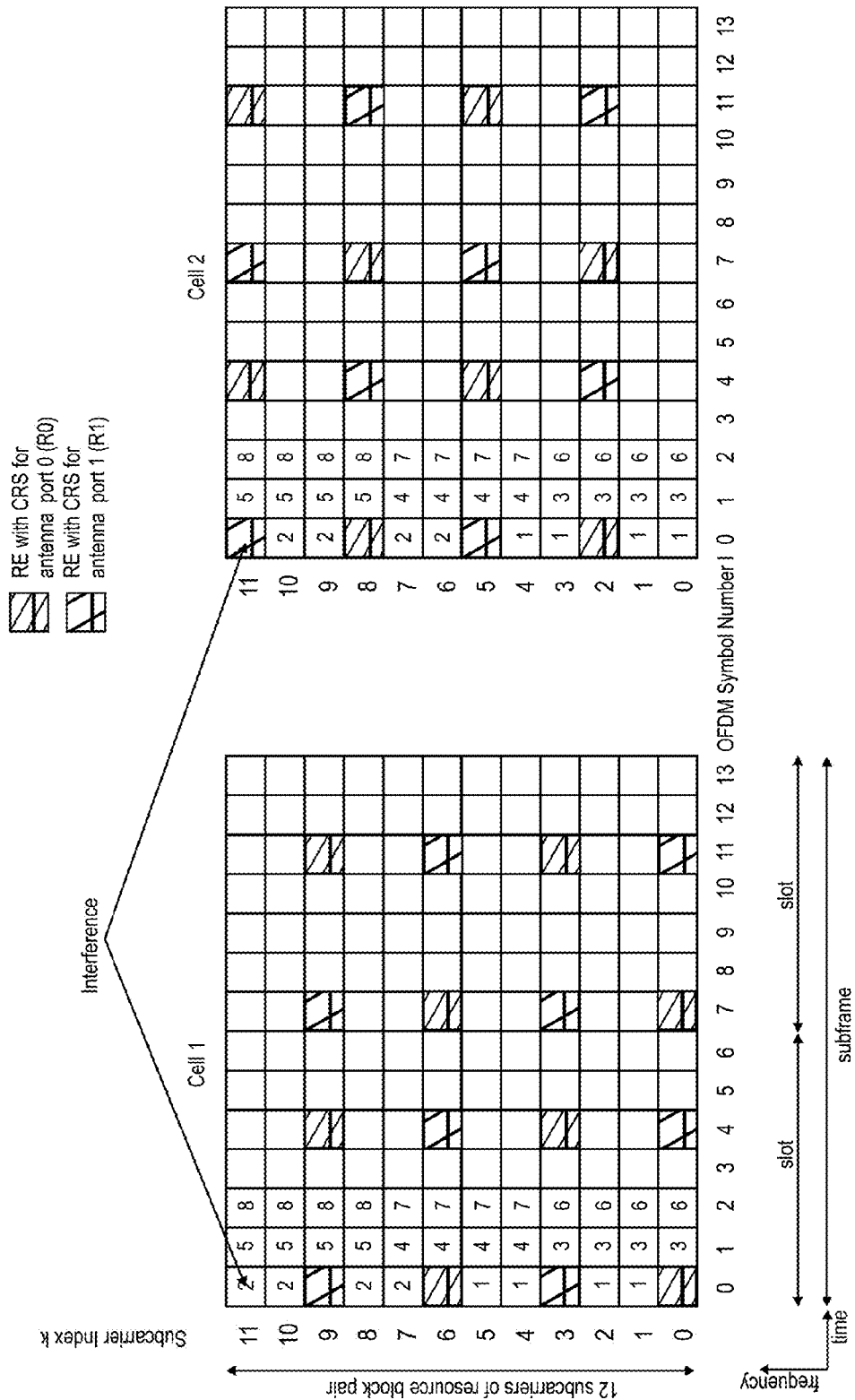

In different cells, the location of the CRS can be different in frequency, as shown in FIGS. 11 and 12, where the CRS are shifted by one subcarrier in the frequency domain. This cell-specific mapping may however lead to interference problems as will be explained with reference to FIGS. 16 and 17. As illustrated, the CRS location in the PRB pair of FIG. 16 is different from the CRS location of FIG. 17; CRS are shifted by two subcarriers in the frequency domain. For illustration purposes, the interference problems caused by the cell-specific mapping will be discussed mainly with reference to the PDCCH region of FIGS. 16 and 17. However, the interference problems explained in the following occur as well in the RE-to-eREG mapping in the PDSCH region.

The resource element (11,0) is assigned in cell 1 to (e)REG2, and in cell 2 this resource element (11,0) is not assigned to any (e)REG but is used for the common reference signal. Correspondingly, between different cells the same resource element in the same physical resource block pair is used differently. Consequently, the resource element in cell 2 used for CRS can cause strong interference with the same resource element from cell 1, and vice versa. This may even lead to data loss of resource element (11,0), since reference signals are generally transmitted with high transmission power. In case of SFBC, the SFBC pair in OFDM symbol 0 at subcarriers 10, 11 might become void due to the interference caused by the CRS resource element (11,0) of cell 2.

Furthermore, in the Coordinated Multipoint (CoMP) scenario 3/feICIC, as explained in 3GPP TR 36.819, or in interference coordination cases, the resource element (11,0) of cell 1, experiencing interference from the same resource element of cell 2, could be muted (or voided) so as to not generate interference to the CRS in cell 2, in order to improve a UE's channel estimation quality of the cell 2 CRS; such a muting (or voiding) would be indicated to the other cell(s) and/or UE(s) generally by RRC signaling, and the resource element would not be used for transmission in cell 1. When using SFBC, this would mean that the whole SFBC pair could not be used, and RE(10,0) would be void as a consequence too. Therefore a whole SFBC pair is lost even though just a single RE needs to be muted, resulting in a reduced spectral efficiency operation in cell 1.

The RE-to-eREG mapping explained with reference to FIG. 14 is not only cell-specific as just explained with reference to FIGS. 16 and 17, but is also UE-specific, for the reason that the DMRS and CSI-RS configuration/presence is UE-specific and corresponding REs are not used for the RE-to-eREG mapping of FIG. 14. In other words, since the assumption on the presence and position of the DMRS and CSI-RS in the time-frequency grid of the resource block pair may differ from UE to UE, the RE-to-eREG mapping in the PDSCH region also may differ from UE to UE. This issue will be explained in more detail with regard to FIGS. 18 and 19.

It should be noted that this issue was not existent for the RE-to-REG mapping in the PDCCH region, since no UE-specific reference signals are located in the PDCCH region (see UE specific reference signals of FIGS. 8A and 8B).

FIGS. 18 and 19 disclose different RE-to-eREG mappings for UE1 and UE2, based on the RE-to-eREG mapping rule introduced for FIG. 14. FIG. 18 has the same RE-to-eREG mapping as FIG. 14, since the same number and location of reference signals is assumed. On the other hand, FIG. 19 differs in the RE-to-eREG mapping since a different CSI-RS is assumed for UE2. In particular, for UE2 the resource elements (4,9), (4,10), (5,9), (5,10) and (10,9), (10,10), (11,9), (11,10) are not used for CSI-RS but may be assigned to eREGs.

As a result, the RE-to-eREG mappings up to OFDM symbol 9, subcarrier 1 is the same for both UEs; however, the remaining grouping of resource elements is different, illustrated within dashed-lines box in FIG. 19.

There are further UE-specific configurations that thus may lead to differing RE-to-eREG mappings between one UE and another UE, such as the PDCCH length, which may be 1, 2 or 3 OFDM symbols depending on UE configuration. Though not depicted in the figures, it can be appreciated that if the RE-to-eREG mapping rules as explained with reference to FIG. 14 start at different OFDM symbols, the result of the RE-to-eREG mapping will differ significantly.

It is difficult to multiplex several ePDCCHs for different UEs with different UE-specific configurations (CSI-RS, interfered CRS, PDCCH length) in the same PRB pair. Different UEs could have a different understanding of which REs belong to which eREG, making ePDCCH multiplexing (i.e. targeting different UEs) more complicated. In order to optimally multiplex different UEs' ePDCCHs in the same PRB pair, the utilized REs for UE1 should be completely non-colliding with the utilized REs for UE2. As we assume that the smallest unit for an ePDCCH transmission is an eCCE, and an eCCE itself is formed out of at least 2 eREGs, this means that optimal multiplexing can be achieved if different eREG indices are used for different UEs, provided that the different eREGs do not include one or more identical REs. However, as seen from FIGS. 18 and 19, it can happen that e.g. RE (1,11) for UE1 belongs to eREG #3, while UE2 thinks it belongs to eREG #7. Optimal multiplexing is therefore not possible in case eREG #3 should be used to transmit an ePDCCH to UE1 at the same time that eREG #7 should be used to transmit an ePDCCH to UE2. There could be eREG combinations that still allow optimal multiplexing; however, discovering those will increase the complexity for the network and significantly reduces the flexibility (since not every eREGs can be assigned to any UE), as well as reduce the spectral efficiency (since it might likely occur that not all eREGs can be utilized by the network in the same subframe).

Figures 20, 21:
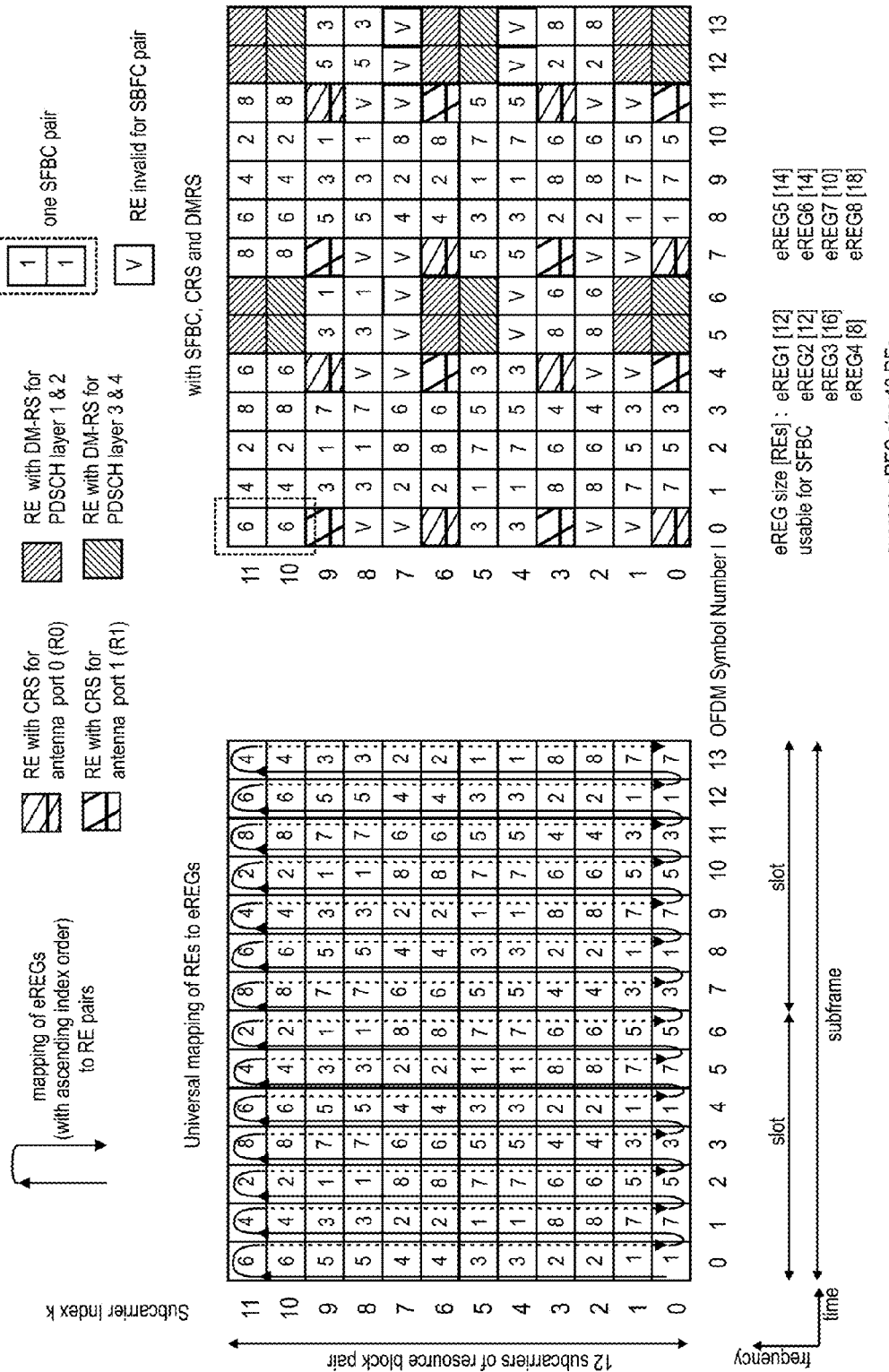
FIG. 20 illustrates an optimized RE-to-eREG mapping for the PDCCH and PDSCH region that is universal and not UE- or cell-specific.
FIG. 21 illustrates the RE-to-eREG mapping of FIG. 20, and further illustrates how SFBC transmissions are applied thereto and the resulting void resource elements for SFBC.
Figures 24, 25:
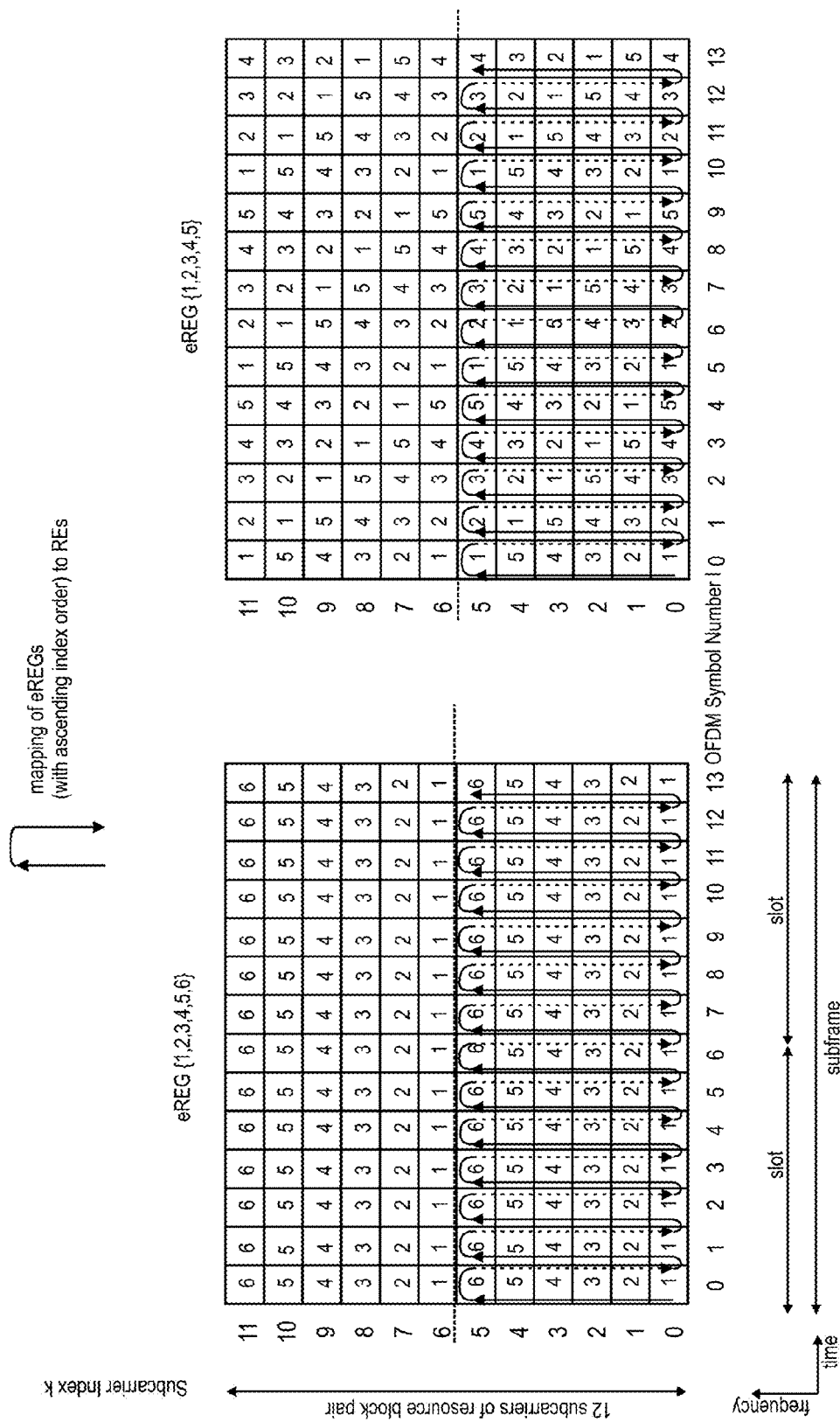
FIG. 24 illustrates the RE-to-eREG mapping according to the embodiment of the invention where the total number of eREGs is 6.
FIG. 25 illustrates the RE-to-eREG mapping according to the embodiment of the invention where the total number of eREGs is 5.
Figures 26, 27:
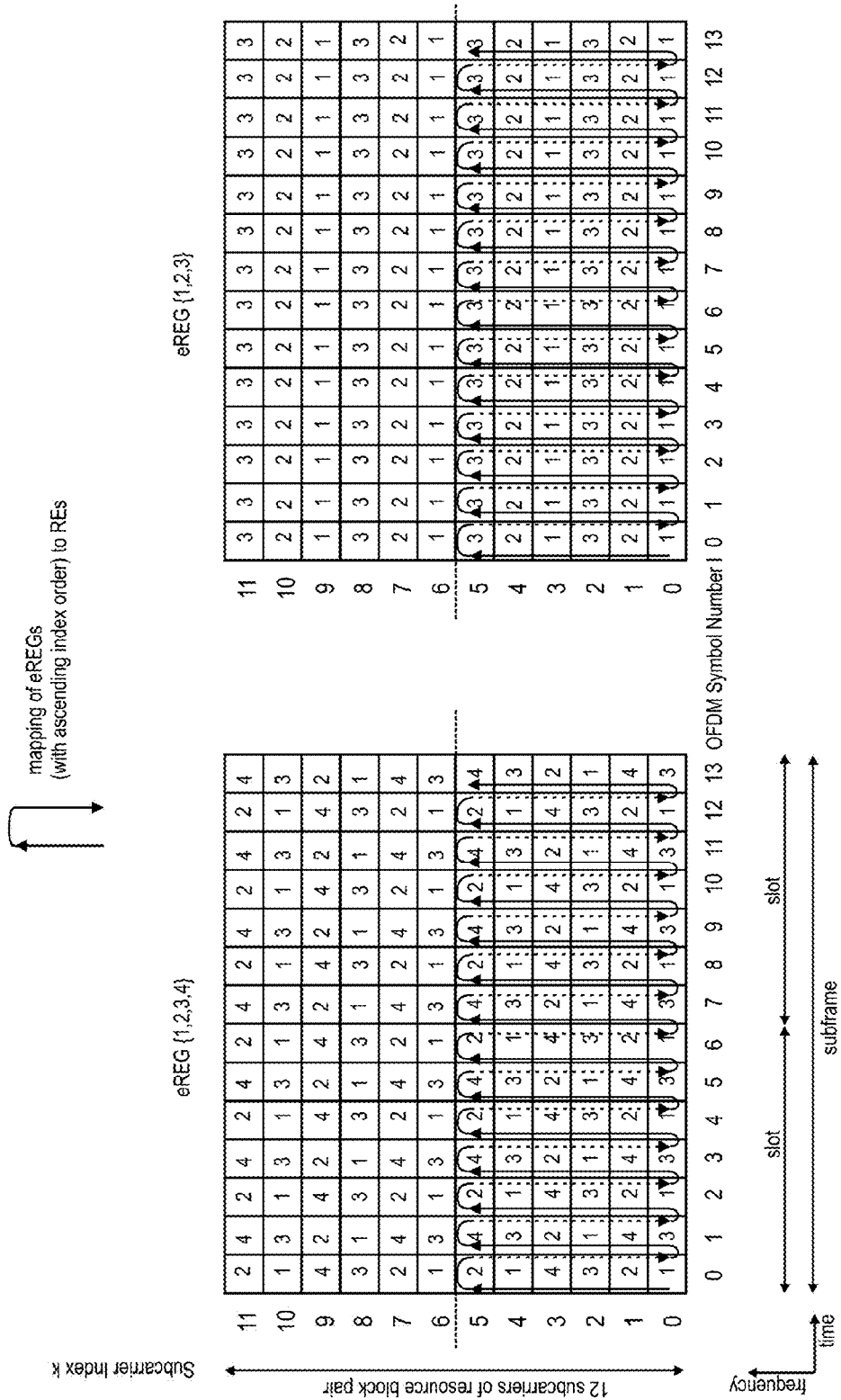
FIG. 26 illustrates the RE-to-eREG mapping according to the embodiment of the invention where the total number of eREGs is 4.
FIG. 27 illustrates the RE-to-eREG mapping according to the embodiment of the invention where the total number of eREGs is 3.

In order to overcome the problems stemming from the cell-specific and UE-specific RE-to-eREG mappings, FIG. 20 introduces a different RE-to-eREG mapping that is cell and UE independent, i.e. a universal/uniform mapping to be applied to the whole of the PRB pair without considering the cell-specific and UE-specific reference signals, or other signals or channels. Although the description is focusing on generally considering reference signals, this should be understood as merely referring to the most frequently occurring reference signals in a subframe; however, this is generally applicable to other kinds of signals or channels that may occupy REs in a PRB pair for other purposes than the transmission of an enhanced control channel.

In more detail, the resource elements are assigned to ascending eREGs in pairs of two adjacent REs in ascending order of the subcarriers within each OFDM symbol, and then in ascending order of OFDM symbols. The assigning of two adjacent REs to the same eREG is mainly done for supporting SFBC. The assigning is done without taking into account the reference signals in the physical resource block pair. The eREGs are cyclically extended such that eREG numbers are assigned as follows {1,2,3,4,5,6,7,8,1,2,3,4,5,6,7,8, 1,2,3, . . . } until all resource elements of a physical resource block pair are assigned to one out of the $m_{max}$ eREG.

If these mapping rules are applied, the result can be seen in FIG. 20, where the resource elements are assigned to 8 eREGs 1-8. As can be seen, for the RE-to-eREG mapping of FIG. 20 the reference signals are disregarded, i.e. not considered. Correspondingly, eREGs are assigned to pairs of adjacent REs (adjacent in the frequency domain) in an ascending order of eREGs, in an ascending order of subcarriers within each OFDM symbol within a PRB pair, and in an ascending order to OFDM symbols in the PRB pair.

Such a universal mapping as depicted in FIG. 20 is the same for different cells and for different UEs; correspondingly, the disadvantages stemming from cell-specific and UE-specific RE-to-eREG mappings are avoided. Each UE has the same understanding of which REs belong to which eREG, although some UE may be allowed to use some other REs than other UEs (due to differing UE-specific reference signals).

FIG. 21 assumes the same RE-to-eREG mapping as for FIG. 20, but further illustrates the CRS, DMRS (CSI-RS is disregarded for illustration purposes) and the use of SFBC. Put differently, the RE-to-eREG mapping of FIG. 20 is masked by the reference signals, such as those of FIGS. 7 and 8.

In particular, the resource elements used for reference signals are blocked and cannot be used for transmissions or SFBC transmissions; FIG. 21 furthermore indicates those resource elements as void (V) that cannot be used for SFBC transmissions due to the masked RE used for reference signals and its effect on the SFBC pair. As example, in OFDM symbol 0, the resource elements (2,0), (3,0) cannot be used for SFBC transmissions, since eREG1 is assigned to (2,0) and eREG2 is assigned to (3,0), and the corresponding REs to form an SFBC pair are blocked by the CRS at (0,0) and (3,0). For similar reasons, resource elements (7,0),(8,0) are void, etc. In total, 24 resource elements become void for SFBC use due to the blocking of REs by the reference signals. FIG. 21 also indicates the eREG sizes in number of resource elements. As apparent, each eREG comprises resource elements in the whole physical resource block pair according to the following table:

| | eREG1 | eREG2 | eREG3 | eREG4 | eREG5 | eREG6 | eREG7 | eREG8 | average |
|---|---|---|---|---|---|---|---|---|---|
| Size in RE | 12 | 12 | 16 | 8 | 14 | 14 | 10 | 18 | 13 |

As can be seen from the above, the eREG size varies between 8 for eREG 4 and 18 for eREG8, in the particular example of FIG. 21; this is a significant variation that is disadvantageous. To understand the following example, for sake of clarity it is assumed that the eREG index is determined by two numbers: the eREG index p within a PRB pair e.g. as shown in FIG. 20, and the PRB pair index q where the eREG is transmitted. Therefore, an eREG index (p,q) occupies the same REs relative to the PRB pair as eREG index (a,q+1), just in another PRB pair. It is also important to note that while it is assumed for simplicity that two eREGs form an eCCE, it is not required that they are residing in the same PRB pair. In a localized eCCE transmission, the eREGs should reside in the same PRB pair, so that e.g. eREG (p, q) and eREG (p', q) form an eCCE, where p is not equal to p'. In distributed transmission, the eREGs should reside in different PRB pairs, such that e.g. eREG (p, q) and eREG (p', q') form an eCCE, where q is not equal to q'. With the example of p=4 and p'=8, in the distributed eCCE transmission the diversity effect would be imbalanced because much more than half of the REs are transmitted in one PRB pair; if that PRB pair happens to face a bad channel condition, then the other PRB pair cannot so easily compensate because less information is contained therein. In localized as well as distributed transmissions an RE imbalance is not favorable due to channel estimation. Generally, it is possible that different eREGs use different antenna ports as the basis for channel estimation; the different antenna ports can occupy different REs as shown e.g. in FIG. 14 for ports 7 and 9. Consequently, different REs may face different interference scenarios, as interference may occur at different levels due to other cell's transmission of PDSCH, CSI-RS, DM-RS or similar on the respective RE. As a consequence, the quality and therefore accuracy of the channel estimation may be different for different ports, and therefore also for different eREGs. Then an imbalance of the number of REs that are affected by the corresponding possibly inferior channel estimation may cause more than half of the REs due to be detected erroneously not because of noise or interference on the eREG RE themselves, but due to inferior channel estimation accuracy.

Furthermore, a lot of resource elements become void/wasted, since they cannot be used for an SFBC pair.

An improved RE-to-eREG mapping rule will be explained in connection with FIG. 22 and FIG. 23, according to an embodiment of the invention. This embodiment shall also use a universal/uniform mapping, as already done with reference to FIG. 20. Thus, for the following embodiment of the invention, also a universal/uniform mapping of resource elements to resource element groups is assumed; universal (or similarly uniform, may also be termed "common") in this context means that the mapping does assign the resource elements to eREGs irrespective of whether a resource element is blocked by a reference signal or not. Put differently, the universal mapping ignores the presence of the reference signals. As will be explained later in connection with FIGS. 33-35, a universal mapping may consider reference signals, but only in case the reference signals are always present, i.e. are not cell or UE specific. Thus, a universal mapping applies in the same manner to all resource block pairs independent from the particular cell or UE-specific reference signals that are transmitted. As a result, when such a common mapping is assumed, all resource elements of a PRB pair are available for eREGs, and not just those that are not used for reference signals, again, with the restriction explained in connection with FIGS. 33-35.

Using such a common RE-to-eREG mapping also allows a future extension to e.g. new carrier types without effects on the eREG/eCCE size balance. A new carrier type could be characterized by the lack of the control channel region (PDCCH, i.e. the control region size is 0), or the lack or reduced density of CRS transmissions, or the introduction of additional reference (or other) signals, or the redefinition of currently defined signals that would be transmitted on additional or different REs. Such REs would be handled just like currently defined signals, i.e. they would be applied as a kind of masking to the universal mapping when determining which RE is available for a transmission; however, the order or the association of REs to eREGs would not be affected.

The improved RE-to-eREG mapping rule of this embodiment however shall also have a good performance when used for SFBC as well without SFBC. Although the mapping rule shall be common to all PRB pairs as explained above (i.e. disregard the reference signals), this improved mapping rule shall still consider the positioning of the reference signals in the resource block pair in a different way. In particular, in order to reduce the amount of the resource elements that become void (i.e. are lost) for use in SFBC transmissions due to the blocking of REs by reference signals, if one RE of an SFBC pair within one OFDM symbol assigned to an eREG is blocked by a reference signal, the other RE of that SFBC pair assigned to said same eREG in that OFDM symbol shall be blocked too; thus, the mapping rule shall be such that it considers the positioning of the reference signals to achieve an optimum performance. Since the association of an RE to an eREG index is not depending on whether SFBC is used for that eREG according to the present invention, it is possible to use REs in the non-SFBC case that would be blocked or voided in the SFBC case. The present invention also allows multiplexing of eREGs that use SFBC and that do not use SFBC in the same PRB pair, greatly increasing the multiplexing capability and flexibility for the network, and therefore simplifying to reach the target of an efficient usage of the available resources.

To said end, the assigning of a resource element pair to the same eREG, is such that said two resource elements of the resource element pair within the OFDM symbol are not adjacent (as done so far, e.g. FIG. 20) but are spaced apart according to the positioning of the reference signals.

Figure 7:
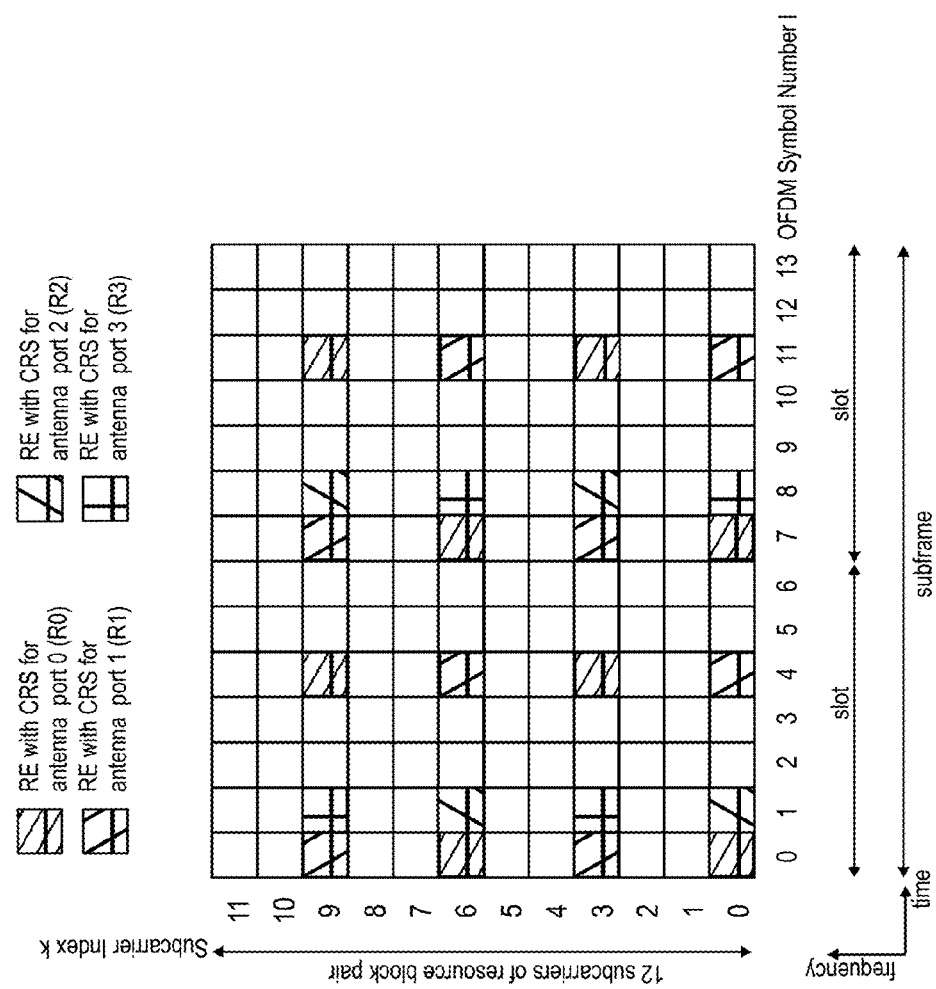
FIG. 7 illustrates the common reference signals for antenna ports 0 to 3 in a resource block pair.

In particular, when studying the cell-specific reference signals CRS in FIG. 7, it can be seen that the separate CRS are spaced apart by six subcarriers; e.g. the CRS for antenna port 0 are at subcarriers 0, 6 in OFDM symbols 0, 7 and at subcarriers 3, 9 in OFDM symbols 4, 11; e.g. the CRS for antenna port 3 is positioned at subcarriers 3, 6 in OFDM symbol 1, and at subcarriers 0, 6 in OFDM symbol 8. While the particular CRS are spaced apart by 6 subcarriers (as shown above), when considering more than one CRS, the CRS are spaced apart by three subcarriers in the frequency domain; e.g. for OFDM symbols 0, 1, 4, 7, 8 and 11, at subcarriers 0, 3, 6, 9.

This similarly applies to the UE-specific reference signals DMRS and CSI-RS of FIGS. 8A and 8B, where within one OFDM symbol the same reference signal is spaced apart by 5 or 6 subcarriers (i.e. 5 or 6 resource elements in the frequency domain). For example, DMRS for antenna ports 7 and 8 are located at subcarriers 0, 5 in OFDM symbols 5, 6, 12, 13; thus, with a difference of 5 subcarriers. On the other hand, the CSI-RS are repeated every 6 subcarriers, as apparent from FIG. 8B.

Thus, according to one embodiment of the invention, two resource elements to be assigned to the same eREG in an OFDM symbol are spaced apart by 6 subcarriers, i.e. 6 resource elements in the frequency direction. Furthermore, the RE-to-eREG mapping sequentially assigns REs to eREGs in a predetermined order (in the following in an ascending order) of subcarriers, OFDM symbols and enhanced resource element groups.

The thus resulting mapping rule how eREGs are assigned to the resource elements of a resource block pair is illustrated in FIG. 22. As apparent therefrom, for the lower and upper half of the resource block pair (12 subcarriers are divided in two parts, with each 6 subcarriers) the eREGs are sequentially and cyclically assigned to the resource elements ascending by subcarrier for each OFDM symbol and ascending by OFDM symbol until all resource elements of the lower part of the resource block pair are assigned to an eREG; the same applies to the upper half of the resource block pair.

When actually applying this mapping rule, the RE-to-eREG mapping of FIG. 23 is achieved; a total number of 8 eREGs is assumed therein. FIGS. 24-27 show the RE-to-eREG mapping according to this mapping rule of FIG. 22 respectively for 6, 5, 4, 3 eREGs.

For the exemplary mapping of FIG. 23 with 8 eREGs, the eREGs are assigned as follows:

eREG1(k,l) with (0,0), (6,0), (2,1), (8,1), (4,2), (10,2), (0,4), (6,4), (2,5), (8,5), (4,6), (10,6), (0,8), (6,8), (2,9), (8,9), (4,10), (10,10), (0,12), (6,12), (2,13), (8,13);

eREG2(k,l) with (1,0), (7,0), (3,1), (9,1), (5,2), (11,2), (1,4), (7,4), (3,5), (9,5), (5,6), (11,6), (1,8), (7,8), (3,9), (9,9), (5,10), (11,10), (1,12), (7,12), (3,13), (9,13);

eREG3(k,l) with (2,0), (8,0), (4,1), (10,1), (0,3), (6,3), (2,4), (8,4), (4,5), (10,5), (0,7), (6,7), (2,8), (8,8), (4,9), (10,9), (0,11), (6,11), (2,12), (8,12), (4,13), (10,13);

eREG4(k,l) with (3,0), (9,0), (5,1), (11,1), (1,3), (7,3), (3,4), (9,4), (5,5), (11,5), (1,7), (7,7), (3,8), (9,8), (5,9), (11,9), (1,11), (7,11), (3,12), (9,12), (5,13), (11,13);

eREG5(k,l) with (4,0), (10,0), (0,2), (6,2), (2,3), (8,3), (4,4), (10,4), (0,6), (6,6), (2,7), (8,7), (4,8), (10,8), (0,10), (6,10), (2,11), (8,11), (4,12), (10,12);

eREG6(k,l) with (5,0), (11,0), (1,2), (7,2), (3,3), (9,3), (5,4), (11,4), (1,6), (7,6), (3,7), (9,7), (5,8), (11,8), (1,10), (7,10), (3,11), (9,11), (5,12), (11,12);

eREG7(k,l) with (0,1), (6,1), (2,2), (8,2), (4,3), (10,3), (0,5), (6,5), (2,6), (8,6), (4,7), (10,7), (0,9), (6,9), (2,10), (8,10), (4,11), (10,11), (0,13), (6,13);

eREG8(k,l) with (1,1), (7,1), (3,2), (9,2), (5,3), (11,3), (1,5), (7,5), (3,6), (9,6), (5,7), (11,7), (1,9), (7,9), (3,10), (9,10), (5,11), (11,11), (1,13), (7,13).

This mapping rule may also be expressed mathematically by the following formula:

$$m(k', l') = ((k' \bmod d_{sc}) + f(l')) \bmod m_{max} + 1$$

$$f(l') = \begin{cases} m(t-1, l'-1) + 1 & l' > 0 \\ 0 & l' = 0 \end{cases}$$

wherein m(k',l') is the function to determine the resource element group m for a resource element at position (k', l'), where $m_{max}$ is the total number of enhanced resource element groups to be assigned for the resource block pair, with m∈{1,2, ... $m_{max}$−1, $m_{max}$}. k' is the subcarrier index within the resource block pair with k'∈{0, 1, 2 ... 10 11}, and l' is the OFDM symbol index within the resource block pair with l'∈{0, 1, 2 ... 10, 11} or l'∈{0, 1, 2 ... 12, 13}. $d_{sc}$ refers to the subcarrier difference and basically indicates how much the two resource elements are spaced apart in each OFDM symbol, and is a design parameter; it may be preferably either 3 or 6. "t" is $N_{sc}^{RB}$ or $N_{sc}^{RB}(/2)$, wherein $N_{sc}^{RB}$ is the number of subcarriers per resource block and is preferably 12. It may be noted that even if $d_{sc}$ is set to 6, the result can look like, e.g. shown in FIG. 27 where the distance between two REs belonging to the same eREG is 3, or e.g. shown in FIG. 26 where the distance is sometimes 2 and sometimes 4; however the common characteristic is that at a distance of 6, two REs will always be assigned to the same eREG index.

From that perspective, REs (k',l'),(k'+$d_{sc}$,l') form an SFBC pair in case SFBC should be used, as will be explained in more detail later.

Although the above formula applies to an ascending order of the eREGs, the invention is however not restricted thereto and is applicable to any predetermined order such as a descending order. Also, m(k',l') gives out an eREG starting with "1"; however, the formula may be adapted to use an eREG index starting with "0" as well, simply by subtracting 1.

Put into words, the RE-to-eREG mapping rule for the exemplary embodiment of FIG. 22 may be as follows.

The RE-to-eREG mapping rule applies similarly to lower and upper part of the resource block pair. The resource elements of the first OFDM symbol are assigned to the resource element groups, in a first predetermined order of the resource elements in the frequency domain (i.e. of subcarriers) and a second predetermined order of the resource element groups, wherein the first and second predetermined orders are an ascending order in this particular case. Then, the resource elements of the second OFDM symbol and of each further of the remaining OFDM symbols in the resource block pair are assigned to the resource element groups, in the same first predetermined order of the resource elements and in the same second predetermined order of the resource element groups; however, with the further rule that the first resource element group to be assigned in this second or further OFDM symbol is the one subsequent-in-order to the resource element group last assigned for the previous OFDM symbol.

The above basically circumscribes the mapping rule depicted by the arrows in FIG. 22, which run meander-like through each of the two halves of the resource block pair. Though not mentioned above, without loss of generality, the starting number of the eREGs is 1. Alternatively, the starting number of the assigning of eREGs may be any another number; for example the starting number may be 8, when assuming a total of 8 eREGs, and more in general $m_{max}$.

The association between RE and eREG within an OFDM symbol is done in such a way as to arrive in an assignment of number of REs per eREG as fairly as possible within the above constraints, taking the REs into account that are assigned in other OFDM symbols of the same subframe and PRB pair.

In alternative representation, the following pseudo-code can be used to determine the association between eREG index m and RE index (k', l') of a PRB pair:

| | |
|---|---|
| 1) | Initialize m = 1 (resource-element group number) |
| 2) | Initialize l' = 0 |
| 3) | Initialize k' = 0 |
| 4) | Resource elements (k', l') and (k' + $d_{sc}$, l') are assigned to eREG m |
| 5) | Increase m by 1 |
| 6) | If m > $m_{max}$ then reset m = 1 |
| 7) | Increase k' by 1 |
| 8) | Repeat from step 4 if k' < $\frac{N_{sc}^{RB}}{2}$ |
| 9) | Increase l' by 1 |
| 10) | Repeat from step 3 if l' is smaller than the number of OFDM symbols in a subframe |

Figures 28, 29:
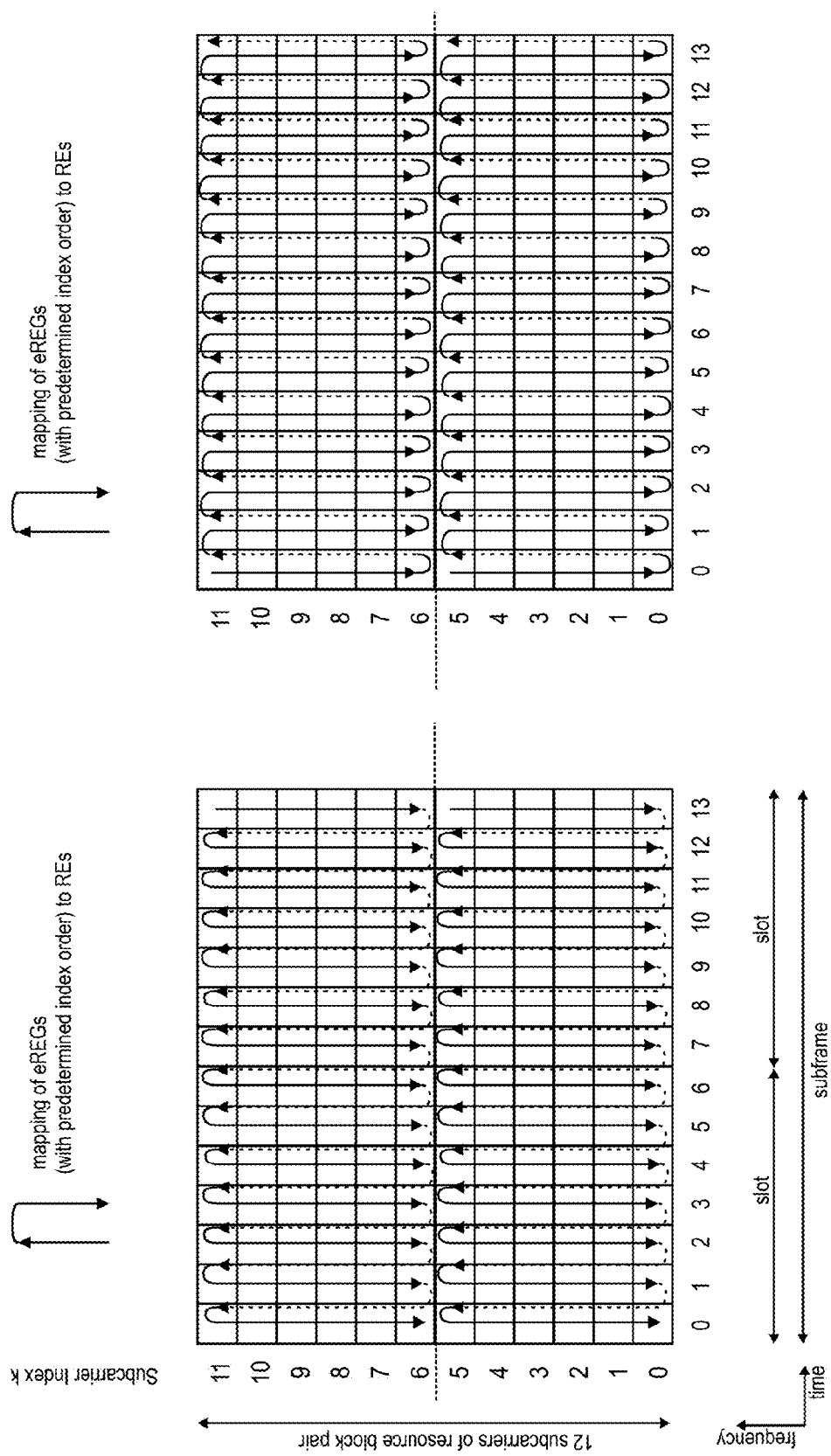
FIG. 28 illustrates the RE-to-eREG mapping rule with descending orders for the subcarrier index and OFDM symbol number.
FIG. 29 illustrates the RE-to-eREG mapping rule with a descending order for the subcarrier index, and an ascending order for the OFDM symbol number.

FIG. 28 exemplifies the above-described RE-to-eREG mapping rule for descending orders of OFDM symbols and subcarriers within each OFDM symbol; the order for the eREG may be either ascending, descending or any other predetermined order. FIG. 29 exemplifies the above-described RE-to-eREG mapping rule for a descending order of subcarriers within each OFDM symbol but for an ascending order of OFDM symbols; again, the order for the eREGS may be either ascending, descending or any other predetermined order.

Figure 30:
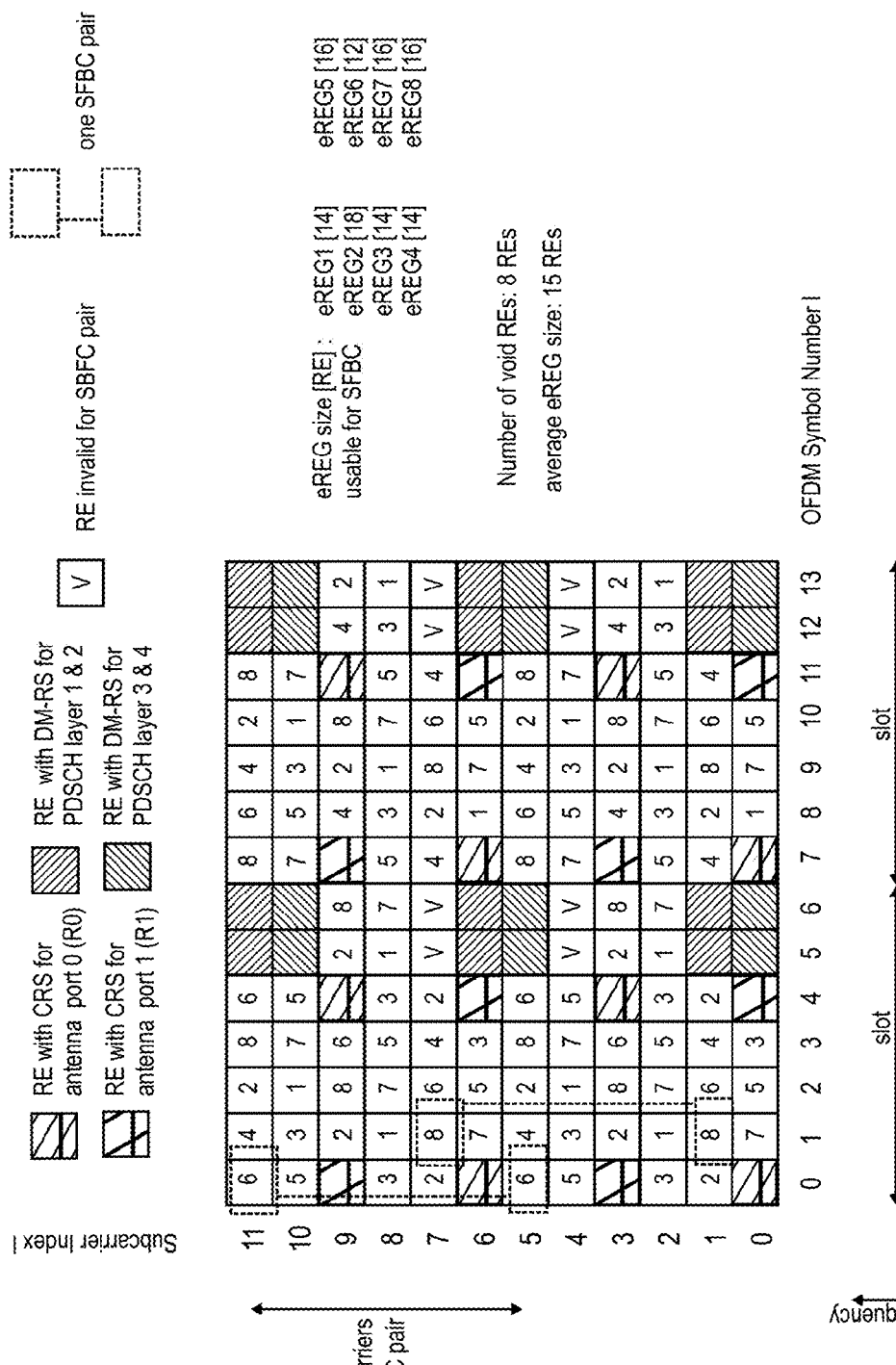
FIG. 30 illustrates the RE-to-eREG mapping of the embodiment of FIG. 23, and further illustrates how SFBC transmissions are applied thereto and the resulting void resource elements for SFBC.

FIG. 30 illustrates the same RE-to-eREG mapping of FIG. 23; furthermore, FIG. 30 also illustrates exemplary reference signals, such as the CRS and DMRS and illustrates how SFBC can be applied to the eREGs of the resource block pair. As can be seen, an SFBC pair is composed of two resource elements in the same OFDM symbol assigned to the same eREG, the resource elements of the SFBC pair being spaced by six subcarriers, i.e. k' and k'+6. In FIG. 30 only two SFBC pairs are exemplary depicted; of course, SFBC is applied to all possible resource element pairs, if needed.

An RE that is assigned to an eREG is only used for an eCCE transmission if all of the following criteria are met:
  it is not used for transmission of at least one of PBCH, synchronization signals, cell-specific reference signals, MBSFN reference signals, CSI reference signals or UE-specific reference signals, and
  in case SFBC is used for the eREG, the above criterion is fulfilled for both the REs forming an SFBC pair.

Put differently, not all resource elements can be used, since some are blocked by reference signals. The CRS reference signals puncture a complete SFBC pair, as will be explained. With regard to SFBC transmissions some further resource elements that are not masked by reference signals, become lost nonetheless, for the reason that they cannot form a valid SFBC pair in the OFDM symbol. All resource elements that are lost for SFBC due to blocking of corresponding resource elements are depicted as V in FIG. 30. For example, the resource element (4, 5) is invalid for SFBC, since the corresponding resource element (10, 5) is blocked by a DMRS. Similarly, resource element (7,5) is void (i.e. invalid), due to resource element (1, 5) being used for DMRS. The reason is that the spacing used for DMRS is five and not six as applied to the RE-to-eREG mapping of FIGS. 22 and 23.

On the other hand, the reference signals CRS do not cause additional resource elements to become void, since each CRS for antenna port 0 uses two resource elements that are spaced apart by 6, which is the same as the spacing used for the RE-to-eREG. In other words, the CRS block resource elements within an OFDM symbol that are assigned to the same eREG and forming one (or generally more) SFBC pair, due to the mapping rule being adapted in that way.

As a result, apart from the REs that are blocked by reference signals, there is a total of 8 resource elements that become void in the PRB pair. Compared to the RE-to-eREG mapping of FIG. 20, the amount of resource elements that become void thus unavailable is reduced by 16.

In the following table, the size in RE for each eREG is listed.

| | eREG1 | eREG2 | eREG3 | eREG4 | eREG5 | eREG6 | eREG7 | eREG8 | average |
|---|---|---|---|---|---|---|---|---|---|
| Size in RE | 14 | 18 | 14 | 14 | 16 | 12 | 16 | 16 | 15 |

As can be seen from the above, the eREG size varies between 12 and 18. Compared to the RE-to-eREG mapping of FIG. 20, the eREG size is more balanced, which allows for a more evenly distributed signal quality in case different eREGs are tied to different antenna ports for channel estimation/demodulation. The more balanced eREG size also allows for a more fair frequency diversity in case of mapping to distributed PRB pairs.

If two eREGs are assumed per eCCE, then the average eCCE size is 30 resource elements, in the above example of FIG. 30 (i.e. with SFBC, CRS and 24 DMRS).

Compared to the RE-to-eREG mapping of FIG. 20, the average eREG size of the embodiment of the invention is higher by 2 resource elements; put differently, about 15% higher(when calculating the benefit as the ratio 2/13). Correspondingly, there is 15% more redundancy available for the eCCE, which may be seen equivalent to a 0.62 dB power gain when the power per transmitted RE is constant.

Another advantage of this embodiment of the invention is that the utilization of SFBC can be applied per eREG index, so that even in the same PRB pair certain eREGs can utilize SFBC and other eREGs do not utilize SFBC; still all eREGs use the same mapping of REs to eREGs, which allows a very flexible utilization of all resources in a PRB pair even for intended receivers that have different transmission requirements (e.g. with and without transmit diversity, such as SFBC).

When assuming that at least two eREGs are combined to form an eCCE, which is the smallest unit to transmit downlink control information (=L1/L2 control signaling), it is further preferred that $m_{max}$ is a multiple of the number of eREGs that are combined to form an eCCE. In such a case, it is possible that different eREGs belonging to the same eCCE are transmitted in different PRB pairs, which allows for obtaining frequency diversity (from the radio channel perspective) and/or noise/interference diversity (from the noise or interference perspective that might be generated by neighboring transmitters or other noise/interference sources).

In addition, the eREGs that are combined to form an eCCE have preferably different indices. If eREGs of the same PRB pair are combined, then this is straightforward because each eREG can only be used once per PRB pair. In the case of combining eREGs of at least two different PRB pairs, this should be done for uniformity of the indexing and combination, and also because in this way the resulting number of REs per eCCE can be equalized across eCCEs. As shown, the number of REs per eREG may differ from eREG to eREG, but it is generally independent of the PRB pair where the eREG (or eCCE) is/are mapped. Assuming that the eREG index numbering is identical in each PRB pair, combining different eREG indices into an eCCE allows therefore more similar number of REs in the resulting eCCEs. It should be noted that the underlying principle is not tied to the eREG index as such, but rather to the RE positions within each PRB pair. So in case that the eREG indexing is different for different PRB pairs, it is still preferred that an eCCE is formed by combining REs with different indices k',l' relative to each PRB pair, which for convenience and abstraction reasons is equivalent in this description to the eREG index.

In the above embodiments of the invention (especially according to FIGS. 22-30) a spacing between an SFBC pair of 6 has been assumed, $d_{sc}$=6. According to another embodiment of the invention, the spacing may be 3, $d_{sc}$=3. The above shown formula can be used as well. FIG. 31 shows the mapping rule to be applied so as to assign eREGs in a cyclically extended order to the resource elements as indicated by the meander-like arrows. FIG. 32 shows the result, i.e. the RE-to-eREG mapping when using 8 eREGs and an ascending order of the eREGs.

For a further embodiment of the invention it is assumed that the UE shall always consider certain DMRS to be present in a resource block pair. In other words, the presence of those DMRS are no longer UE-specific but may be considered to be present for every UE alike, at least for matters of associating the REs to eREGs; every UE assumes that certain DMRS are present or transmitted on the corresponding resource elements, or at least that the corresponding REs cannot be used for any eREGs (i.e. they are reserved). This does however not apply to the CSI-RS; they are still UE-specific. In a preferred embodiment, in LTE DMRS antenna ports 7-10 are in this way assumed to be always present by all UEs.

The RE-to-eREG mapping of the previous embodiments can be adapted to take the result of this assumption into account, to thus further reduce impact of reference signals. In general, the RE-to-eREG mapping can be adapted such that the resource elements occupied by the DMRS shall not be assigned to an eREG but are skipped during the assigning process. The mapping can still be considered to be universal/uniform, since it is still cell and UE-independent.

The corresponding RE-to-eREG mapping rule is depicted in FIG. 33, for the case that the a RE spacing $d_{sc}$ of 6 is assumed and 24 REs are used for DMRS. As apparent from the mapping rule the DMRS at OFDM symbols 5, 6, 12 and 13 are ignored for the assigning, i.e. the corresponding REs reserved or occupied by the DMRS are not used for the RE-to-eREG assigning. According to this mapping rule, an SFBC pair in OFDM symbols 5, 6, 12 and 13 is formed by REs that are spaced apart by five resource elements, while the spacing for the SFBC is six for the remaining OFDM symbols.

Compared to FIG. 30 it can be seen that, when applying SFBC to the mapping of FIG. 33, four void resource element are avoided; with the mapping rule on which FIG. 30 is based resource elements (4, 5), (4,6), (7,4) and (7,5) are void, while all remaining REs of OFDM symbols, 5, 6 can be used with the mapping of FIG. 33. When also considering the OFDM symbols 12 and 13, 8 REs are "saved", since basically no RE becomes lost (void).

FIG. 34 is based on the mapping rule introduced with reference to FIGS. 31 and 32, but also skips the resource elements reserved for the DMRS, similar to FIG. 33. The resulting mapping rule and the result thereof are depicted in FIG. 34. While in OFDM symbols 0-4, 7-11 an SFBC pair is formed by resource elements being spaced by 3 subcarriers, in OFDM symbols 5, 6, 12 and 13 the spacing varies, though SFBC pairs could be formed since there are respectively two REs per eREG.

Figure 35:
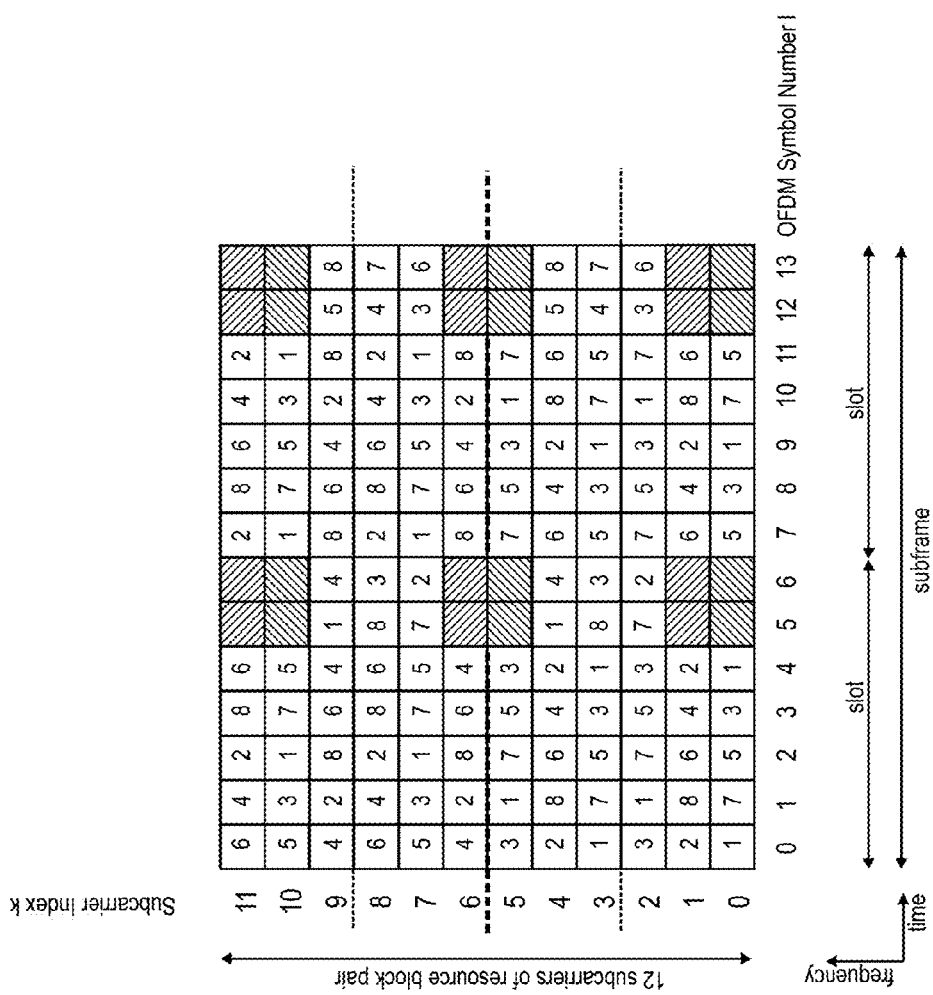
FIG. 35 illustrates the RE-to-eREG mapping according to still another embodiment of the invention.

Looking at the previously described pseudo-code, step 4 could be replaced by the following steps (where step 8 points to step 4a instead):

4a) If the OFDM symbol l' contains reserved REs (e.g. due to DMRS) then continue with step 4d
    4b) Resource elements (k',l') and (k'+$d_{sc}$,l') are assigned to eREG m
    4c) Continue with step 5
    4d) If resource element (k',l') is reserved then continue with step 7
    4e) Assign resource elements (k',l') and (k'+5,l') to eREG m Another embodiment of the invention is illustrated in FIG. 35. Similar to the embodiments of FIGS. 33 and 34, the resource elements reserved or occupied by DMRS are skipped for the RE-to-eREG assigning. However, the actual RE-to-eREG mapping rule differs additionally, from the previous ones. As can be seen from FIG. 35, a basic spacing of 3 is used; i.e. resource elements that are spaced apart by 3 subcarriers are assigned to the same eREG. However, instead of starting for each part of the resource block pair with the first index of the eREG (assuming an ascending order of eREG indices e.g.), the assigning of eREG starts in the two parts of the upper half with that index which succeeds the last one used for the two parts of the lower half.

Put differently, instead of assigning three different eREGs to the resource elements within one OFDM symbol (see FIGS. 31, 32), a total of six different eREGs are assigned.

In particular, in OFDM symbol 0, in the two parts of the lower half eREGs1-3 are assigned in the sequential order. Then, in the upper half of OFDM symbol 0 eREGs 4-6 are assigned respectively in the two parts. In the next OFDM symbol 1 the subsequent eREGs 7-8 and the cyclically extended eREG 1 are mapped to the resource elements of the two parts of the lower OFDM half. In general, for each further OFDM symbol the eREGs are assigned that are subsequent-in-order to the ones assigned in the previous OFDM symbol; e.g. in OFDM symbol 8 the six eREGs 3-8 are assigned, which results in that for the subsequent OFDM symbol 9 the six eREGS 1-6 are assigned to the resource elements.

This rule is applied throughout the resource block pair, as apparent from FIG. 35. As already mentioned, in OFDM symbols 5, 6, 12 and 13 the resource elements used for the DMRS are not assigned to any eREG, but are skipped in the assigning processing.

When SFBC is applied for transmissions based on the RE-to-eREG mapping of FIG. 35, it can be seen that for OFDM symbols 1-4, 7-11 a SFBC spacing of 3 is used (i.e. spacing in subcarriers between the REs forming one SFBC pair), while in OFDM symbols 5, 6, 12 and 13 a SFBC spacing of 5 is used. As with FIG. 33, no REs become void for SFBC in OFDM symbols 5, 6, 12 and 13 due to the reference signals.

Further Embodiments

In the following, a further embodiment of the invention is presented. In case of high velocity, the fading in time causes an inaccurate estimation especially for the first OFDM symbols in a subframe, since the DMRS and CSI-RS are only available as of OFDM symbol 5 (see FIG. 8). Of course, the quality of the first OFDM symbols may be extrapolated from the reference signals transmitted at OFDM symbols 5, 6, 9, 10, 12 and 13. However, the estimation may differ significantly from the actual received signal quality, which is especially true when the mobile terminal moves at high velocities, such as 100 km/h.

This may lead to problems that the information that is conveyed by the OFDM symbols at the beginning of a subframe are demodulated with an erroneous channel estimate, which results effectively in another noise source particularly for coherent (de-)modulation such as used in modern mobile communication systems. In a simple example, information is transmitted as +1 or −1 in the complex signal plane. Even if the transmission of such information is noise-free, a channel estimation error of 180 degrees (equivalent to multiplying the received value by −1) will result in errors in all cases, because a transmitted +1 will be seen as −1 and a transmitted −1 will be seen as a +1 at the receiver.

According to this further embodiment of the invention, the mobile terminal may monitor its own velocity, and determine whether it exceeds a predetermined velocity threshold. The threshold is set such that it may be assumed that the estimation of channel quality for at least some of the first OFDM symbols (i.e. OFDM symbols 0-4) based on the one of OFDM symbols 5-13 is not accurate enough.

If the velocity threshold is exceeded, the mobile terminal disregards the resource elements of OFDM symbols of index 0 to ≤Ir in a resource block pair, where Ir is either 4, 3, 2 or 1. Preferably, the Log Likelihood (LLR) for those REs are nulled, meaning that the further processing of the resource elements assumed that the resource elements are unreliable and will thus be discarded by the UE. It is assumed that the redundancy in the resource block pair regarding the remaining REs suffices to correctly receive the data.

"Ir" may be defined by the UE implementation and may thus differ from one UE to another. Therefore, it is advantageous that the mobile terminal transmits information about the particular Ir to the base station. Also, the base station may know the predetermined velocity threshold applied by the mobile terminal whether to use or not the first OFDM symbols. The predetermined velocity threshold is either preconfigured in the base station, or the base station is informed by the mobile terminal.

According to a further embodiment, also the base station monitors the velocity of the mobile terminal to determine whether the UE velocity exceeds the corresponding threshold. If it exceeds the threshold, the base station may transmit the first Ir OFDM symbols with zero power (similar to RE-puncturing). Again the last OFDM symbol for which this is applied may be mainly up to the particular implementation, or may be informed to the base station by the mobile terminal.

Alternatively, the base station, once it determines that the mobile node is moving too fast and thus transmits the first OFDM symbols with zero power, may inform the mobile terminal of this fact. For example, the PCFICH may be used in said respect. Thus, the mobile terminal would know when and which OFDM symbols he should not use.

One advantage is that the power saved in the base station, due to transmitting the first OFDM symbols with zero power, could be used to boost e.g. resource elements in other PRB pairs in the corresponding "saved" OFDM symbols.

The base station may e.g. estimate the UE velocity from the handover count.

In order for the eNB to be aware that the first symbols are unreliable for the UE, the UE includes a corresponding suggested starting OFDM symbol, e.g. in the CSI report applicable for ePDCCH. Such a knowledge at the eNB enables the eNB to not even transmit REs targeting the corresponding UEs with any power in the corresponding OFDM symbols; instead, the saved power can be used to increase the transmit power of other REs (such as those targeting a different UE that does not suggest a corresponding starting symbol) in the same OFDM symbol(s) to improve their quality at the receiver.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A base station in a communication system using Orthogonal Frequency-Division Multiplexing (OFDM) comprising:
   a processor which, in operation, implements a mapping that applies to each of a first and second frequency domain half of a resource block pair, wherein resource elements (REs) of the resource block pair are assigned to a plurality of resource element groups according to the mapping; and
   a transmitter which, in operation, transmits control channel information based on the resource element groups according to the mapping; wherein
   the resource elements of the first OFDM symbol are assigned to the resource element groups, in a first predetermined order of the resource elements and a second predetermined order of the resource element groups,
   the resource elements of the second OFDM symbol and of each of the remaining OFDM symbols in the resource block pair are assigned to the resource element groups, in the first predetermined order of the resource elements and in the second predetermined order of the resource element groups, such that the first resource element group to be assigned for an OFDM symbol is the one subsequent-in-order to the last resource element group assigned for the previous OFDM symbol, and
   space-frequency block coding (SFBC) is used for transmitting resource element groups in a resource block pair, one out of a plurality of SFBC pairs is defined to use two resource elements of the same resource element group within each OFDM symbol, wherein one of the two resource elements of the SFBC pair in the same OFDM symbol has a subcarrier index k and another of the two resource elements of the SFBC pair has a subcarrier index k+3 or k+6 in a frequency domain.

2. The base station according to claim 1, wherein the plurality of resource element groups is a plurality of enhanced resource element groups (eREGs), and the processor, in operation, decodes at least one enhanced Physical Downlink Control Channel (ePDCCH) based on the eREG-to-RE mapping of the corresponding eREGs that form the ePDCCH.

3. The base station according to claim 1, wherein the first and second predetermined order is either an ascending or descending order.

4. The base station according to claim 1, wherein the resource elements are cyclically assigned to the resource element groups with respect to the resource element groups, such that the resource element group being last according to the second predetermined order is followed by the resource element group being first according to the second predetermined order.

5. The base station according to claim 1, wherein a resource element spans one subcarrier in the frequency domain and one OFDM symbol in a time domain, wherein a resource block pair spans 12 subcarriers in the frequency domain and 12 or 14 OFDM symbols in the time domain.

6. The base station according to claim 1, wherein the total number of resource element groups per resource block pair is 3, 4, 6 or 8, and
   wherein the total number of resource element groups per resource block pair is a multiple of the number of resource element groups that form a control channel element.

7. The base station according to claim 1, wherein the mapping is a universal mapping for the resource block pairs used in a OFDM communication system, such that the mapping applies independent from reference signals being assigned to some of the resource elements in the resource block pair.

8. The base station according to claim 1, wherein the processor, in operation,
   determines whether a velocity of a mobile terminal exceeds a predetermined velocity threshold,
   if the velocity threshold is exceeded, the transmitter, in operation, transmits the resource elements of OFDM symbols of index 0 to ≤ Ir in a resource block pair with zero power, where Ir is either 4, 3, 2 or 1, and
   if the velocity threshold is exceeded, the transmitter, in operation, informs the mobile terminal about Ir.

9. The base station according to claim 1, wherein the mapping refers to an enhanced Physical Downlink Control Channel (ePDCCH), and the plurality of resource element groups is a plurality of enhanced resource element groups (eREGs).

10. The base station according to claim 1, wherein in the mapping each resource element of the resource block pair is assigned to one of the plurality of resource element groups.

11. The base station according to claim 1, wherein if one of the two resource elements of the SFBC pair is used for transmitting a reference signal, the other resource element of the SFBC pair is not used for the SFBC transmission.

12. The base station according to claim 1, wherein the mapping for one resource block pair is performed according to the following:

$$m(k', l') = ((k' \bmod d_{sc}) + f(l')) \bmod m_{max} + 1$$

$$f(l') = \begin{cases} m(t-1, l'-1) + 1 & l' > 0 \\ 0 & l' = 0 \end{cases}$$

wherein the plurality of resource element groups consist of m resource element groups, and m(k',l') is the function to determine the resource element group m for a resource element at position (k', l'), where $m_{max}$ is the total number of resource element groups to be assigned for the resource block pair, with m{1,2, ... $m_{max}$−1, $m_{max}$},
wherein k' is the subcarrier index within the resource block pair with k'{0, 1, 2 ... 10 11}, and wherein l' is the OFDM symbol index within the resource block pair with l'{0, 1, 2 ... 11, 12} or l'{0, 1, 2 ... 13, 14}, where $d_{sc}$ is either 3 or 6, wherein t is $N_{sc}^{RB}$ or ($N_{sc}^{RB}/2$), wherein $N_{sc}^{RB}$ is the number of subcarriers per resource block and is 12, and
wherein the two resource elements of the SFBC pair are spaced apart by $d_{sc}$ in the frequency domain.

13. The base station according to claim 1, wherein the at least two resource element groups form a control channel element, and wherein the indexes of the at least two resource element groups forming the control channel element are different.

14. The base station according to claim 1, wherein the assigning of resource elements to resource element groups is cyclic with respect to the resource element groups, such that the resource element group being last according to the second predetermined order is followed by the resource element group being first according to the second predetermined order.

15. The base station according to claim 3, wherein the ascending/descending order of the resource element groups starts with one out of the resource element groups, which is the first/last resource element group, in the ascending/descending order.

* * * * *